United States Patent [19]

Benson et al.

[11] Patent Number: 5,696,627
[45] Date of Patent: Dec. 9, 1997

[54] DIRECTLY MACHINED RAISED STRUCTURE RETROREFLECTIVE CUBE CORNER ARTICLE AND METHOD OF MANUFACTURE

[75] Inventors: Gerald M. Benson, Woodbury; Kenneth L. Smith, White Bear Lake; John C. Kelliher, Oakdale, all of Minn.; Mark E. Gardiner, Santa Rosa, Calif.

[73] Assignee: Minnesota Mining and Manufacturing Company, St. Paul, Minn.

[21] Appl. No.: 326,258

[22] Filed: Oct. 20, 1994

Related U.S. Application Data

[63] Continuation-in-part of Ser. No. 139,563, Oct. 20, 1993, abandoned.

[51] Int. Cl.⁶ .................. G02B 5/122; G02B 5/124
[52] U.S. Cl. .................................. 359/529; 359/530
[58] Field of Search .............................. 359/529, 530, 359/531, 532, 533, 536; 428/184, 177, 174

[56] References Cited

U.S. PATENT DOCUMENTS

| | | | |
|---|---|---|---|
| 1,591,572 | 7/1926 | Stimson . | |
| 2,310,790 | 2/1943 | Jungersen | 88/105 |
| 2,407,680 | 9/1946 | Palmquist et al. | 88/82 |
| 3,190,178 | 6/1965 | McKenzie | 88/82 |
| 3,417,959 | 12/1968 | Schultz | 249/117 |
| 3,632,695 | 1/1972 | Howell | 264/1 |
| 3,684,348 | 8/1972 | Rowland | 359/530 |
| 3,689,346 | 9/1972 | Rowland | 156/245 |
| 3,712,706 | 1/1973 | Stamm | 359/530 |
| 3,810,804 | 5/1974 | Rowland | 156/245 |
| 3,811,983 | 5/1974 | Rowland | 156/245 |
| 3,873,184 | 3/1975 | Heenan | 359/530 |
| 3,922,065 | 11/1975 | Schultz | 359/530 |
| 3,924,929 | 12/1975 | Holmen et al. | 359/530 |
| 3,926,402 | 12/1975 | Heenan | 249/117 |
| 4,025,159 | 5/1977 | McGrath | 359/529 |
| 4,202,600 | 5/1980 | Burke et al. | 359/530 |
| 4,208,090 | 6/1980 | Heenan | 359/514 |
| 4,243,618 | 1/1981 | Van Arnam | 264/1 |
| 4,349,598 | 9/1982 | White | 428/161 |
| 4,498,733 | 2/1985 | Flanagan | 359/529 |
| 4,576,850 | 3/1986 | Martens | 428/156 |
| 4,582,885 | 4/1986 | Barber | 528/28 |
| 4,588,258 | 5/1986 | Hoopman | 359/530 |
| 4,618,518 | 10/1986 | Pricone et al. | 428/40 |
| 4,668,558 | 5/1987 | Barber | 428/156 |
| 4,712,867 | 12/1987 | Malek | 359/530 |
| 4,726,706 | 2/1988 | Attar | 404/14 |

(List continued on next page.)

FOREIGN PATENT DOCUMENTS

| | | |
|---|---|---|
| 423464 | 2/1935 | United Kingdom . |
| 441319 | 1/1936 | United Kingdom . |
| 94/14091 | 12/1992 | WIPO .............. G02B 5/124 |

*Primary Examiner*—Paul M. Dzierzynski
*Assistant Examiner*—Mohammad Y. Sikder
*Attorney, Agent, or Firm*—Gary L. Griswold; Walter N. Kirn; Stephen C. Jensen

[57] ABSTRACT

A cube corner article and method of manufacturing the article from a series of directly machinable unitary substrates. The method of manufacture comprises the first step of providing an initial unitary directly machinable substrate of material suitable for forming retroreflective surfaces. Then a first cube corner element array zone is formed having a plurality of geometric structures including cube corner elements. The zone is created by directly machining at least two sets of parallel grooves in the substrate. A replica of the cube corner element array zone is formed as an additional unitary substrate suitable for forming retroreflective surfaces. Portions of the replica substrate material are removed. The removal of these portions forms at least two intersecting cavities bounded by side walls in the replica at a depth at least that of the cube corner elements formed by the groove sets. Each cavity comprises at least one side wall which extends to a depth into the replica substantially equal to the deepest depth of any other intersecting cavity.

6 Claims, 22 Drawing Sheets

U.S. PATENT DOCUMENTS

| | | | |
|---|---|---|---|
| 4,801,193 | 1/1989 | Martin | 359/530 |
| 4,895,428 | 1/1990 | Nelson et al. | 359/530 |
| 4,938,563 | 7/1990 | Nelson et al. | 359/530 |
| 5,122,902 | 6/1992 | Benson et al. | 359/529 |
| 5,138,488 | 8/1992 | Szczech | 359/529 |
| 5,171,624 | 12/1992 | Walter | 428/156 |

DIRECTLY MACHINED RAISED STRUCTURE RETROREFLECTIVE CUBE CORNER ARTICLE AND METHOD OF MANUFACTURE

CROSS-REFERENCE TO RELATED APPLICATION

This is a Continuation in Part of U.S. patent application Ser. No. 08/139,563, Directly Machined Raised Structure Retroreflective Cube Corner Article And Method of Manufacture, filed Oct. 20, 1993, now abandoned.

FIELD OF INVENTION

This invention relates to retroreflective articles having prismatic retroreflective elements.

BACKGROUND

Many types of retroreflective articles are known, and are made in a variety of ways. One common type of retroreflective article uses transparent microspheres, typically with hemispheric retroreflectors thereon. Examples of this type of retroreflector are disclosed in U.S. Pat. No. 2,407,680 (Palmquist), U.S. Pat. No. 3,190,178 (McKenzie), and U.S. Pat. No. 4,025,159 (McGrath).

Another type of retroreflective article includes prismatic designs incorporating one or more structures commonly known as cube corners. Retroreflective sheeting which employs cube corner type reflective elements is well known. An example of such designs is shown in U.S. Pat. No. 3,684,348 (Rowland).

The manufacture of retroreflective cube corner element arrays is accomplished using molds made by different techniques, including those known as pin bundling and direct machining. Molds manufactured using pin bundling are made by assembling together individual pins which each have an end portion shaped with features of a cube corner retroreflective element. For example, certain pin bundled arrays permit elaborate assembly into various pin structural configurations but these types of arrays become considerably more difficult to manufacture as smaller microcube structures are formed. U.S. Pat. No. 3,926,402 (Heenan et al) and U.S. Pat. No. 3,632,695 (Howell) are examples of pin bundling.

The direct machining technique, also known generally as ruling, comprises cutting portions of a substrate to create a pattern of grooves which intersect to form cube corner elements. The grooved substrate is referred to as a master mold from which a series of impressions, i.e. replicas, may be formed. In some instances, the master is useful as a retroreflective article, however replicas, including multi-generational replicas, are more commonly used as the retroreflective article. Direct machining is an excellent method for manufacturing master molds for small micro-cube arrays. Small micro-cube arrays are particularly beneficial for producing thin replica arrays with improved flexibility, such as continuous rolled goods for sheeting purposes. Micro-cube arrays are also more conducive to continuous process manufacturing. The process of manufacturing large arrays is also relatively easier using direct machining methods rather than other techniques. One example of direct machining is shown in U.S. Pat. No. 4,588,258 (Hoopman).

Some retroreflective articles comprise a ridge-like structure. In the pin bundled field, these types of structures are shown in U.S. Pat. Nos. 4,243,618 (Van Arnam), 4,202,600 (Burke et al), 4,726,706 (Attar), 4,208,090 (Heenan), 4,498,733 (Flanagan), 3,922,065 (Schultz), 3,417,959 (Schultz), and 3,924,929 (Holmen). Another ridge-like structure in a retroreflective article is taught, primarily, for a microsphere or beaded sheeting construction, in U.S. Pat. No. 4,025,159 (McGrath).

Other structures similar to the ridge-like structures described above are described in U.S. Pat. Nos. 4,801,193 (Martin), 4,618,518 (Pricone), and 5,171,624 (Walter). However, these patents merely disclose ridge-like structures which are formed independent of the formation of the adjacent cubes in the retroreflective sheeting. Typically, these structures are cast onto the sheeting rather than being formed integrally, at the same time as the cubes, by direct machining and replication.

SUMMARY OF INVENTION

The invention discloses a method of manufacturing a cube corner article comprising the steps of providing an initial unitary directly machinable substrate of material suitable for forming retroreflective surfaces, and creating a first cube corner element array zone comprising a plurality of geometric structures including cube corner elements in the initial substrate by directly machining at least two sets of parallel grooves in the substrate. A replica is produced of the cube corner element array zone as an additional unitary substrate suitable for forming retroreflective surfaces. Then, removing part of the substrate material comprising the replica forms at least one cavity bounded by side walls in the replica at a depth at least that of the cube corner elements formed by the groove sets. Replicating the replica produces an additional unitary directly machinable substrate suitable for forming retroreflective surfaces. The substrate comprises at least one raised section having side walls at a height at least that of the cube corner elements formed by the initial parallel grooves. At least one raised section is then directly machined to form an additional zone comprising a plurality of geometric structures including cube corner elements bounded by at least two sets of parallel grooves.

The invention also discloses a method of manufacturing a cube corner article comprising the steps of providing an initial unitary directly machinable substrate of material suitable for forming retroreflective surfaces, and creating a first cube corner element array zone comprising a plurality of geometric structures including cube corner elements in the initial substrate by directly machining at least two sets of parallel grooves in the substrate. A replica is produced of the cube corner element array zone as an additional unitary substrate suitable for forming retroreflective surfaces. Then, removing parts of the substrate material comprising the replica forms at least two intersecting cavities bounded by side walls in the replica at a depth at least that of the cube corner elements formed by the groove sets, and each cavity comprises at least one side wall which extends to a depth into the replica substantially equal to the deepest depth of any other intersecting cavity.

The invention also discloses a method of manufacturing a cube corner article comprising the steps of providing an initial unitary directly machinable substrate of material suitable for forming retroreflective surfaces, and creating a first cube corner element array zone comprising a plurality of geometric structures including cube corner elements in the initial substrate by directly machining at least two sets of parallel grooves in the substrate. A replica is produced of the cube corner element array zone as an additional unitary substrate suitable for forming retroreflective surfaces. Removing part of the substrate material comprising the replica forms at least one cavity bounded by side walls in the replica at a depth at least that of the cube corner elements formed by the groove sets, and each cavity is formed in parallel alignment with one of the groove sets.

The invention also discloses a method of manufacturing a cube corner sheeting comprising the steps of providing an initial unitary directly machinable substrate of material suitable for forming retroreflective surfaces, and creating a cube corner element array zone comprising a plurality of geometric structures including cube corner elements in the initial substrate by directly machining at least two sets of parallel grooves in the substrate. A replica is produced of the cube corner element array zone as an additional unitary substrate suitable for forming retroreflective surfaces. Removing part of the substrate material comprising the replica forms at least one cavity bounded by side walls in the replica at a depth at least that of the cube corner elements formed by the groove sets. The replica is then replicated to produce a unitary cube corner sheeting comprising at least one raised section having side walls at a height at least that of the cube corner elements formed by the initial parallel grooves, and stress dissipating means for increasing the strength of the sheeting.

The invention also discloses a method of manufacturing a cube corner article comprising the steps of providing an initial unitary directly machinable substrate of material suitable for forming retroreflective surfaces, and directly machining an initial groove set of parallel grooves in the substrate. Removing part of the substrate material forms at least one cavity bounded by side walls in the substrate at a depth at least that of the first set of parallel grooves. A unitary replica is produced of the initial substrate which is suitable for forming retroreflective surfaces, the replica comprising at least one raised section. Then, additional grooves are directly machined in the replica to form a plurality of zones of geometric structures including cube corner elements bounded by two sets of parallel grooves.

The invention also discloses a cube corner article which is a replica of a zoned unitary substrate formed by directly machining a series of unitary substrates. The zoned article has a plurality of zones of geometric structures including cube corner elements formed by at least two sets of parallel grooves.

The invention also discloses a retroreflective cube corner article sheeting which is a replica of a zoned unitary substrate formed by directly machining a series of unitary substrates. The sheeting comprises a plurality of zones of geometric structures including cube corner elements, and the cube corner elements are formed using at least two sets of parallel grooves. The sheeting comprises at least two adjacent zones each comprising a plurality of cube corner elements having substantially identical geometric structure. The adjacent zones exhibit different optical performance.

The invention also discloses a cube corner article formed by directly machining a series of unitary substrates. The article comprises one zone of geometric structures including cube corner elements, and the cube corner elements are formed using at least two sets of parallel grooves. The article comprises at least two intersecting cavities bounded by side walls with a cavity depth at least that of the deepest geometric structure. The depth of each intersecting cavity is substantially equal.

DETAILED DESCRIPTION OF ILLUSTRATIVE EMBODIMENTS

Direct machining is often a preferred method for efficiently manufacturing master molds for small microcube arrays. This is due to the advantages derived from directly machined substrates in the production of thin replica arrays with improved flexibility, and the relatively more efficient manufacturing steps when compared with pin bundling. An example of a direct machined substrate is taught in U.S. Pat. No. 3,712,706 (Stamm). The Stamm patent and U.S. Pat. No. 4,588,258 (Hoopman) are each examples of structures formed by single or multiple passes of a machine tool having two opposing cutting surfaces for cutting grooves to form cube corner optical faces in a substrate.

It is recognized that directly machined grooves are preferably machined as groove sets comprising a plurality of separate and parallel grooves. In the patent examples cited above, at least three groove sets are required. However, examples of direct machining involving only two sets of grooves are shown in U.S. Pat. No. 4,349,598 (White) and U.S. Pat. No. 4,895,428 (Nelson et al).

Figure 1:
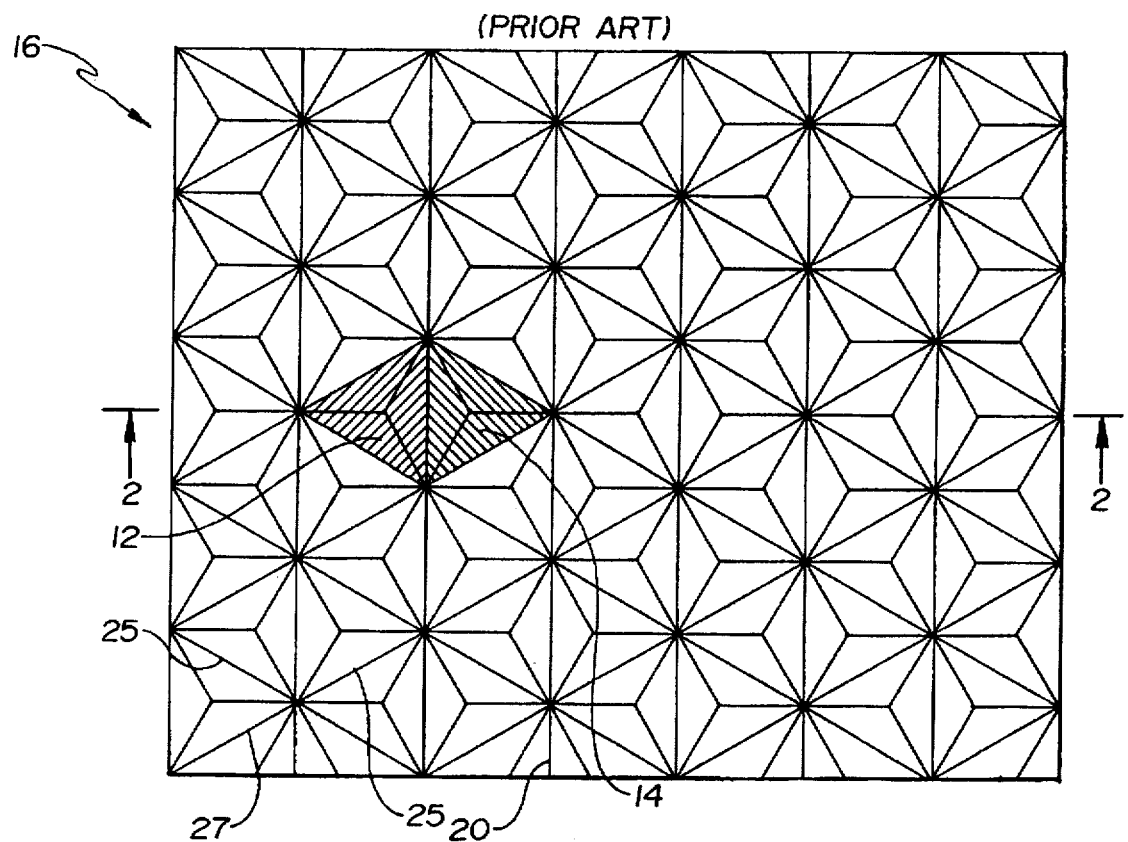
FIG. 1 is a plan view of a conventional three grooved directly machined master for manufacturing retroreflective sheeting.
Figure 2:
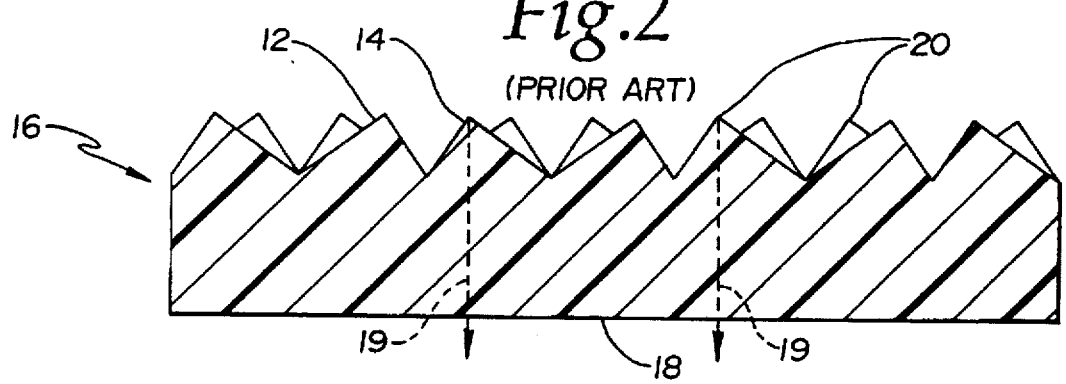
FIG. 2 is a section view taken along lines 2—2 of FIG. 1.

Retroreflective cube corner element arrays are typically derived from matched pairs of cube corner retroreflecting elements, i.e. cubes which are geometrically congruent and rotated 180°, such as cube corner element 12 and cube corner element 14 shown in directly machined cube corner article 16 of FIG. 1. The cube corner elements in article 16 are bounded by grooves having identical groove depths, and are the same element length. The highest points in conventional three groove arrays are defined by the cube peaks 20. All of the elements in article 16 are the same height above a common reference plane 18, as shown in FIG. 2. Other examples of this fundamental matched pair concept relating to conventional cube arrays is shown in U.S. Pat. No. 3,712,706 (Stamm), U.S. Pat. No. 4,588,258 (Hoopman), U.S. Pat. No. 1,591,572 (Stimson), U.S. Pat. No. 2,310,790 (Jungersen), and U.S. Pat. No. 5,122,902 (Benson), and German patent reference DE 42 42 264 (Gubela).

Figure 3:
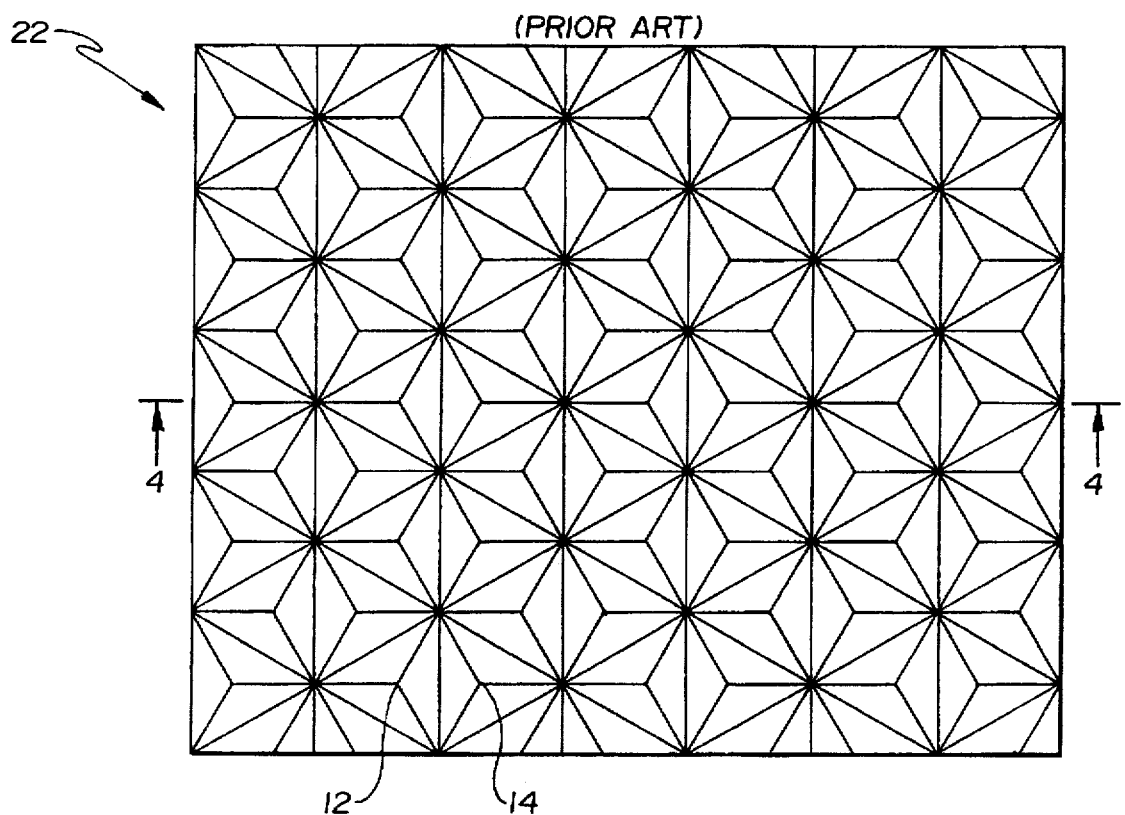
FIG. 3 is a plan view of a retroreflective replica of the master shown in FIG. 1.
Figure 4:
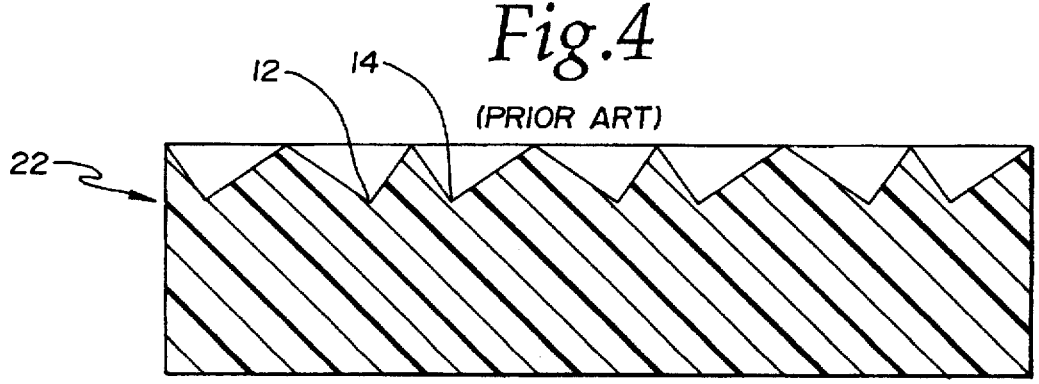
FIG. 4 is a section view taken along lines 4—4 of FIG. 3.

Referring again to FIG. 1 and FIG. 2, one example of conventional non-canted cube corner elements is shown having three sides when viewed in plan view, and having an equilateral triangle formed at the base of each cube corner reflecting element. These cube corner reflecting elements are formed by three groove sets directly machined into a substrate. FIG. 1 shows a plan view of a directly machined cube corner article useful as a master mold which is then replicated, or plated, to form directly machined cube corner article 22 as shown in FIG. 3 and FIG. 4. Referring again to FIG. 1, the grooves 25 in both non-parallel groove sets mutually intersect at representative locations 27.

FIGS. 1 and 2 disclose cube corner element retroreflective arrays comprising non-canted cubes which have individual symmetry axes 19 that are perpendicular to a plane 18. The symmetry axis is a central or optical axis which is a trisector of the internal or dihedral angles defined by the faces of the element. However, in some practical applications it is advantageous to cant or tilt the symmetry axes of the matched pair of cube corner retroreflective elements to an orientation which is not perpendicular to the base plane. The resulting canted cube-corner elements combine to produce an array which retroreflects over a wide range of entrance angles. This is taught in U.S. Pat. No. 4,588,258 to Hoopman, and is later shown below in relation to other figures. Canting may be in either a forward or backward direction. The Hoopman patent includes disclosure of a structure having an amount of cant up to 13° for a refractive index of 1.5. Hoopman also discloses a cube with a cant of 9.736°. This geometry represents the maximum forward cant of cubes in a conventional array before the grooving tool damages cube optical surfaces. The damage normally occurs during formation of a third groove when the tool removes edge portions of adjacent elements. U.S. Pat. No. 2,310,790 (Jungersen) discloses a structure which is canted in a direction opposite that shown in the Hoopman patent.

For these conventional arrays, optical performance is conveniently defined by the percent of the surface area that is actually retroreflective, i.e. which comprises an effective area or active aperture. The percent active aperture varies as a function of the amount of canting, refractive index, and the entrance angle.

At non-zero entrance angles, conventional arrays display, at most, two different aperture shapes of roughly similar size. These result from the single type of geometrically congruent matched pairs of conventional cube corner elements. Canted conventional cube corner arrays exhibit similar trends, although the shape of the aperture is affected by the degree of canting.

Some conventional cube corner arrays are manufactured with additional optical limitations, perhaps resulting from canting or other design features, to provide very specific performance under certain circumstances One example of this is the structure disclosed in U.S. Pat. No. 4,895,428 (Nelson et al), and which is shown in a multiple zone modified configuration in several figures below. In these geometries, the cube corner elements are each canted in a backward direction to the point that each of the base triangles is eliminated.

Referring again to conventional arrays, U.S. Pat. Nos. 4,202,600 (Burke et al), and 4,243,618 (Van Arnam) disclose, and incorporate by reference, the triangular based cube corner reflecting elements or prisms shown in Stamm. The Burke et al patent discloses tiling of these prisms in multiple differently oriented zones to produce an appearance of uniform brightness to the eye when viewed at a high angle of incidence from at least a minimum expected viewing distance. The Van Arnam reference discloses use of pin bundling to create disoriented patterns of cube corner trigonal pyramids and cutting a grid of grooves into a mold formed by the bundled pins. In this manner, the pins may be cut so that sheeting formed from the molds contains raised grids for bonding a backing material to the sheeting. Another example of ridge-like structures in pin bundled retroreflective articles is shown within U.S. Pat. No. 3,632,695 (Howell), in which each ridge-like structure is shaped as a lens area to transmit, rather than reflect, light from a source.

Retroreflective directly machined cube corner articles are often designed to receive a sealing film which is applied to the retroreflective article in order to maintain a low refractive index material, such as air, next to the retroreflective elements for improved performance. Metallized or other reflective coatings may also be utilized advantageously with retroreflective cube corner element articles.

Figure 5:
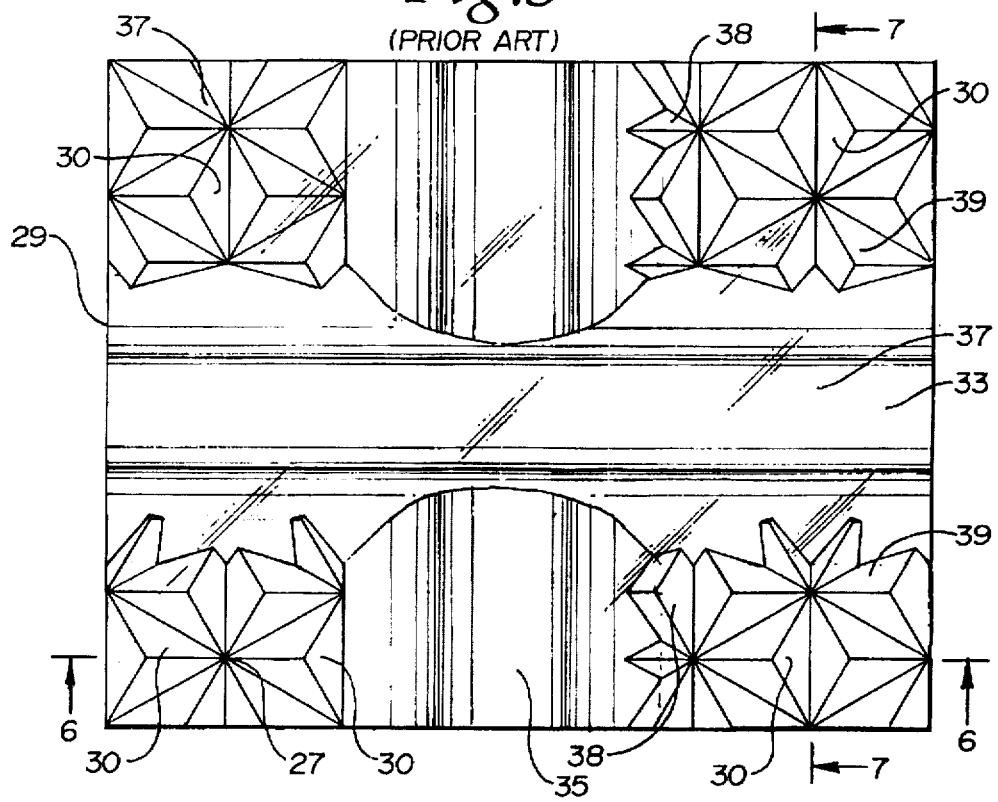
FIG. 5 is a plan view of a known retroreflective sheeting comprising raised sections intersecting at different heights.

FIG. 5 is a plan view of a portion of a cube corner article sheeting 29 representative of that sold under the trademark DURABRITE by, inter alia, Reflexite Corporation of New Britain, Conn., and which was likely formed using direct machining techniques. Cube corner article sheeting 29 comprises a plurality of cube corner elements 30 and a plurality of raised sections 33, 35. The placement, dimensions, orientation, and quality of raised sections in cube corner article sheeting 29 causes unnecessary performance loss in the article. For example, damage to many cubes results in loss of optical performance in the areas adjacent to the raised sections, such as regions 38, 39. The large angle of taper of the raised sections causes excessive loss of retroreflectivity due to the partial or full removal of retroreflective elements necessary to accommodate such large taper. Another problem relates to the height of the raised sections relative to the adjacent structures. The combination of very high raised sections with large angles of taper further reduces the effective retroreflective area of the article. A large height ratio also creates a sheeting which has undesirable handling and rigidity characteristics.

Figure 6:
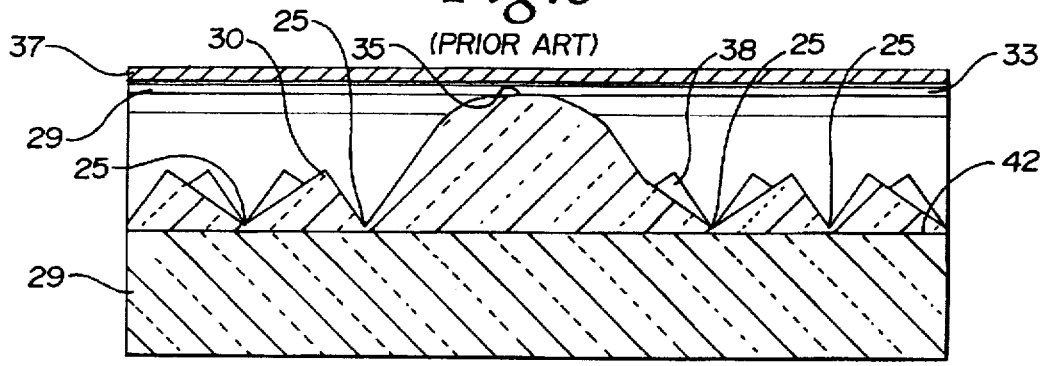
FIG. 6 is a section view taken along lines 6—6 of FIG. 5.
Figure 7:
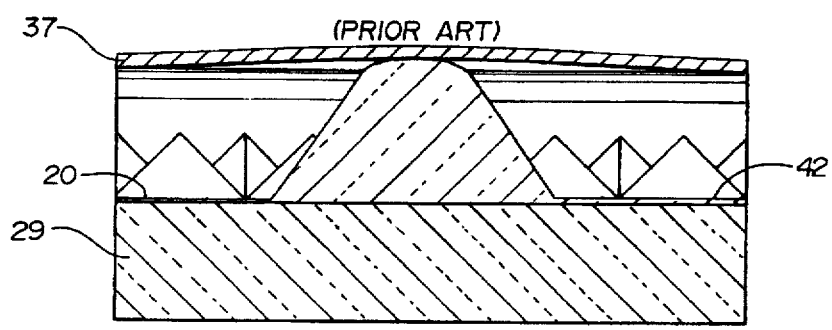
FIG. 7 is a section view taken along lines 7—7 of FIG. 5.

In addition to creating regions of poor optical performance, the construction of this sheeting results in portions of raised sections which intersect at different heights. This is more clearly shown in the section views of FIG. 6 and FIG. 7. These figures clearly illustrate that portions of raised sections 33, 35 are at different heights, with differences of up to about 16% of the overall height of the raised section occuring at a portion of the intersections in sheeting samples. This height differential likely directly affects the durability of a product manufactured with this structure by reducing the strength of any bond of a sealing medium, such as medium 37, onto these raised sections. This occurs due to the bridging affect of the higher section and the resulting poorly bonded or non-bonded regions between the sealing medium and at least one raised section. Bonding reliability of a sealing medium to this sheeting is also degraded by the rounded, imprecise, and inconsistent shape of the top surfaces of the raised sections.

Other structural problems of sheeting 29 relate to the extremely thin land 42 and the particular dimensions of the raised sections. The thin land 42 is likely a result of a particular manufacturing process that in itself is perceived as an efficiency, such as shown and described in U.S. Pat. Nos. 3,689,346 (Rowland), 3,810,804 (Rowland), and 3,811,983 (Rowland). However, such thin land construction actually creates numerous sharp notches at the boundaries of cube corners and a support layer which create points of probable stress failure beneath the grooves, such as grooves 25.

Figure 8:
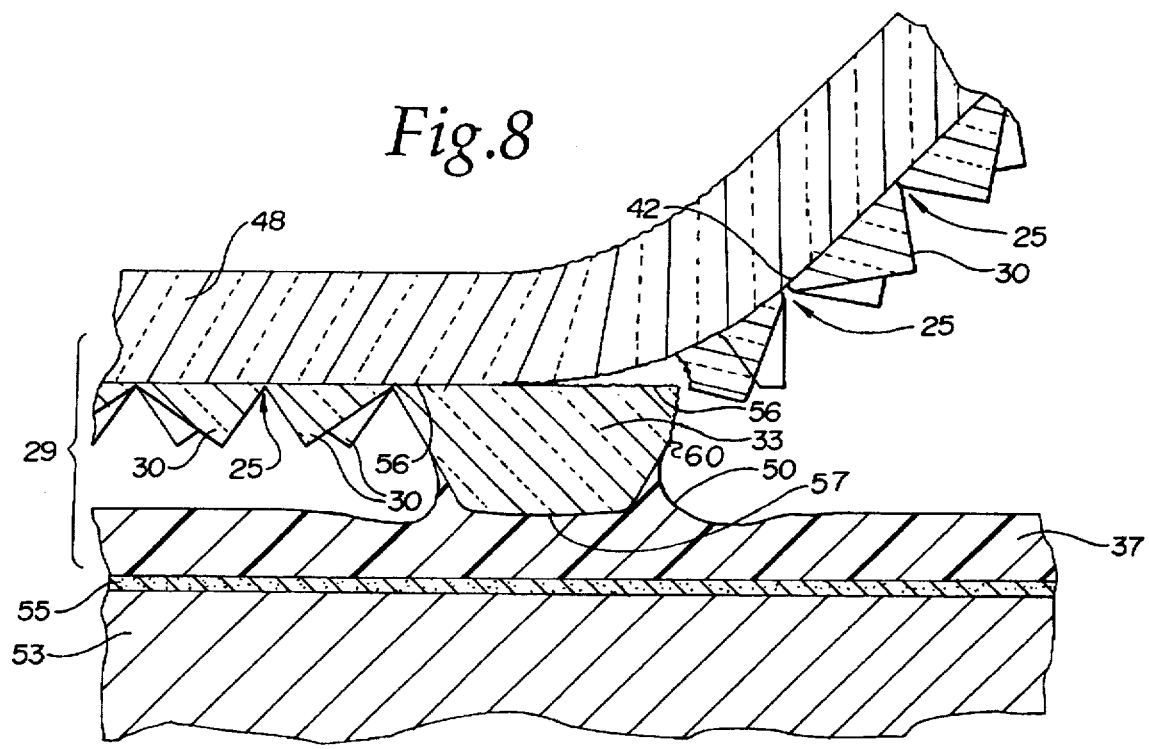
FIG. 8 is a side section view of an article analogous to that shown in FIG. 5 undergoing destructive separation of cube corner elements and a raised section.

FIG. 8 depicts a cube corner article sheeting 29 with a construction comprising a support layer 48 also referred to as a body film/overlay layer, a thin land 42, a plurality of cube corner elements 30, a raised section 33, and sealing medium 37. Cube corner article sheeting 29 is shown with sealing medium 37 attached to raised section 33 with adhesive 50 and to substrate 53 with adhesive 55. FIG. 8 illustrates several problems with sheeting 29. The first problem is one of stress fracture occurring at the locations of grooves 25. This then leads to separation of support layer 48 from raised section 33. This occurs due to the relatively poor strength of the very thin land region beneath raised section 33 and the presence of high stress concentration points at the very sharp boundaries of the base 56 of raised section 33, as compared with the relatively high bond strength of sealing medium 37 attached to ridge surface 57 of raised section 33. This type of failure is aggravated by environmental or vandal related occurrences, and leads to complete loss of retroreflectivity in the affected area of the sheeting due to removal of all or most of the retroreflective cube corner elements. Another problem is the large amount of adhesive necessary to create a bonding layer which compensates for the many imprecisions of the raised sections. As shown in FIG. 8, this bonding layer actually extends a very substantial distance along the tapered side surfaces 60. This migration of adhesive creates a further area of weakness due to the necking effect this creates in the bonding layer adjacent the raised section.

The invention comprises retroreflective directly machined cube corner articles and sheetings, and methods of manufacture, which substantially advance the state of the art in directly machined cube corner articles. This results from use of novel manufacturing processes, and directly machined cube corner article designs which greatly enhance the retroreflective performance and overall durability of these products. These articles are manufactured from a series of unitary substrates, and produce arrays having novel raised structures.

Figure 9:
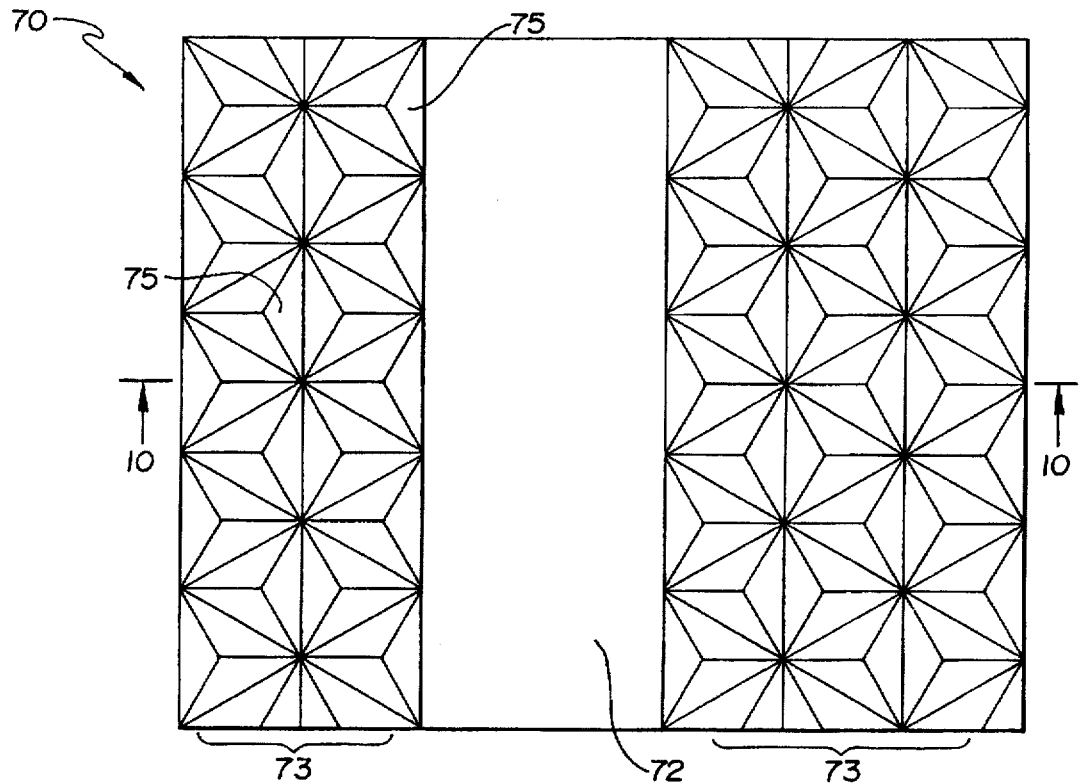
FIG. 9 is a plan view of an initial directly, machinable substrate comprising a cavity portion formed in parallel alignment with one of the groove sets formed in the substrate.
Figure 10:
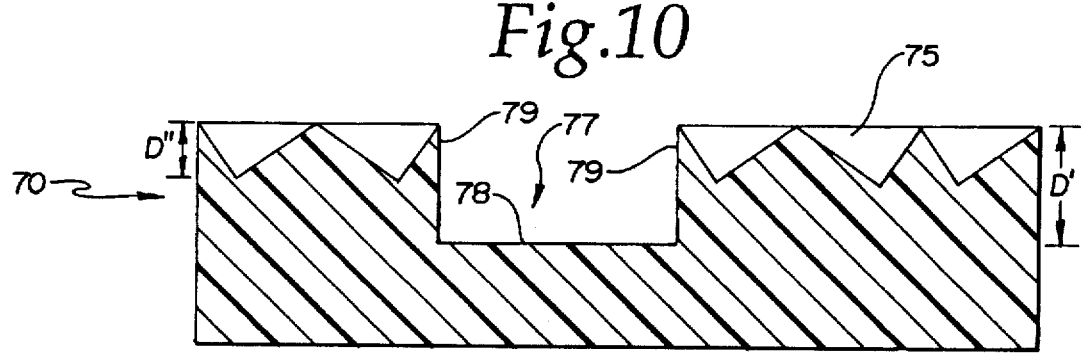
FIG. 10 is a section view taken along lines 10—10 of FIG. 9.

FIG. 9 is a plan view and FIG. 10 is a section view of a replica 70 of an initial directly machinable unitary substrate like, for example, sheeting 22 shown in FIG. 3. Replica 70 comprises zone 73 having a plurality of geometric structures including identical cube corner elements, such as individual elements 75. Part of the substrate material is removed to form at least one cavity 77 bounded by a base 78 and side walls 79 in the substrate, as shown in the section view of FIG. 10. Side walls 79 are machined to a depth D' which is at least that of the depth D" of the initial sets of parallel grooves. In addition to using the preferred substrate materials discussed below, it must be possible to separate replicas from the original pattern or substrate. In some cases, this requires the use of a parting layer between the original and the replica substrates. The parting layer permits separation of replicas by preventing adhesion between the materials of the original and replica materials. Parting layers may consist of a variety of materials such as an induced surface oxidation layer, an intermediate thin metallic coating, chemical silvering, or combinations of different materials and coatings.

Figure 11:
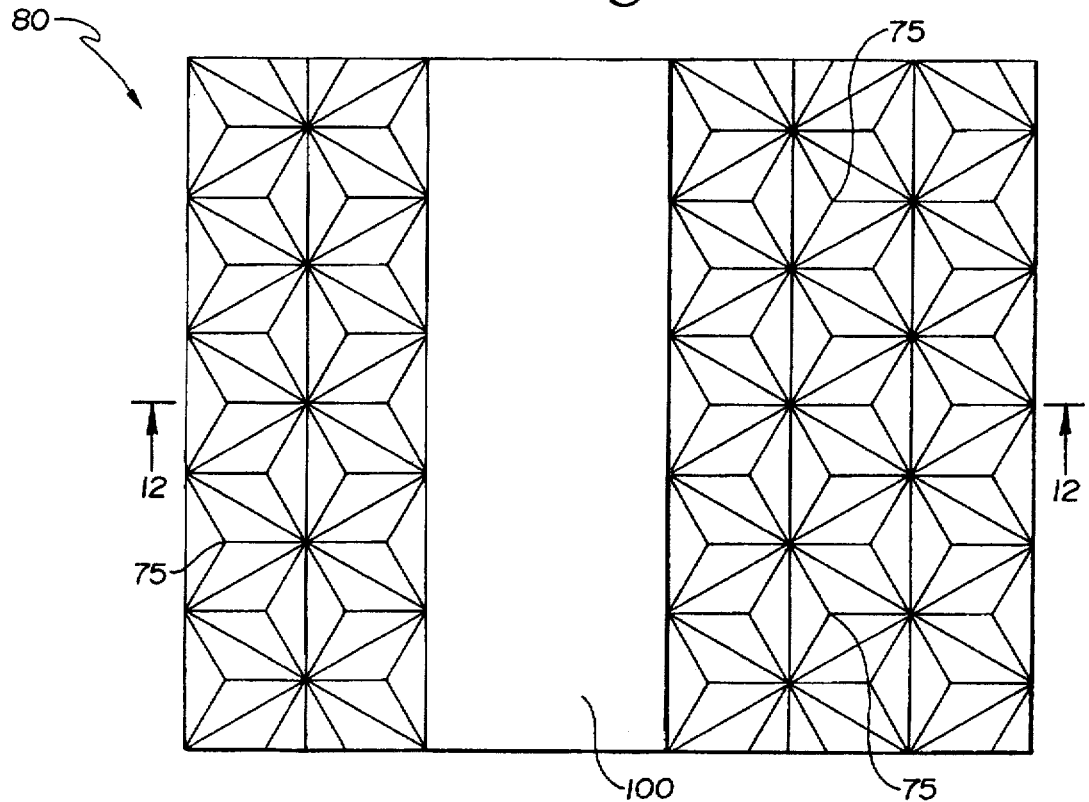
FIG. 11 is a plan view of an additional directly machinable substrate formed by replicating the substrate shown in FIG. 9.

An additional unitary substrate is then formed as a replica 80, as shown in FIG. 11, of directly machinable replica 70. Selection of an appropriate additional unitary substrate must take into account the requirements of replication accuracy of features in the initial substrate, the suitability of the additional unitary substrate for formation of geometric structures including retroreflective cube corner elements, and the ability to separate the additional substrate from the initial substrate without damage to any geometric feature. A unitary initial substrate, a unitary replica 70, or a unitary replica 80 is each preferably formed of material suitable for creating retroreflective surfaces. A substrate suitable for forming retroreflective surfaces according to this invention may comprise any material suitable for forming directly machined grooves or groove sets. Suitable materials should machine cleanly without burr formation, exhibit low ductility and low graininess, and maintain dimensional accuracy after groove formation. A variety of materials such as machinable plastics or metals may be utilized. Suitable plastics comprise thermoplastic or thermoset materials such as acrylics or other materials. Suitable metals and copper. Preferred nickel, and copper. Preferred metals include non-ferrous metals. Preferred machining materials should also minimize wear of the cutting tool during formation of the grooves. It is recognized, however, that an initial substrate may comprise geometric structures which are not cube corner elements.

Figure 12:
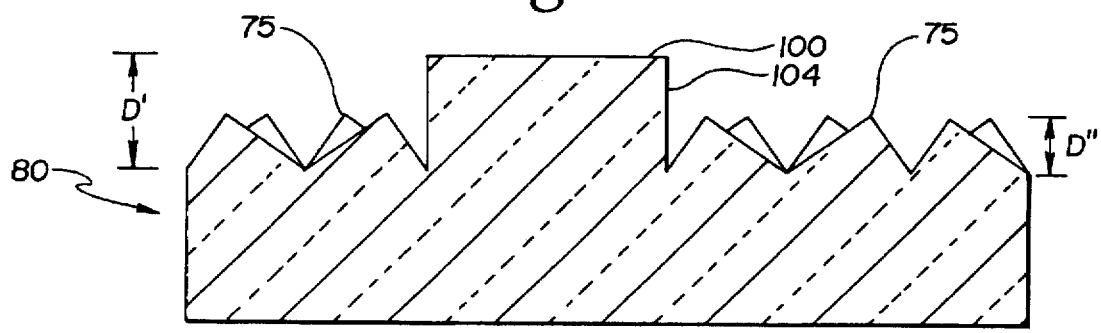
FIG. 12 is a section view taken along lines 12—12 of FIG. 11.

The use of unitary substrates, i.e. consisting of a single piece of material, is quite advantageous over non-unitary substrates, such as those substrates deriving from pin bundled configurations. For example, a unitary substrate obviates the need to handle, cut, and then assemble a myriad of small pins. This promotes greater manufacturing ease and efficiency, and reduces cube damage during manufacture. Use of a unitary substrate is therefore more conducive to direct fabrication of large area arrays which would otherwise require precision handling, cutting, and assembly of a very large number of pins that must display consistent optical performance. As a result of cavity 79 being formed in the replica of the initial directly machinable unitary substrate, unitary replica 80 comprises at least one raised section 100 as shown in FIG. 11 and FIG. 12. Additional grooves and/or cavities may then be directly machined into replica 80, or multi-generational unitary replicas, to form a plurality of zones of geometric structures including cube corner elements 75 bounded by at least two sets of parallel grooves, as discussed below.

The height D' of a raised section 100 side wall 104 corresponds to the depth D' of a cavity side wall 79. Preferably the ratio of the height D' of a side wall 104 to the height D" of the highest cube corner element 75 in an area of the substrate adjacent to the raised section is between about 1.1:1 and about 2:1. This ratio, however, may be exceeded when the raised section is manufactured and used in combination with other novel features described below.

Figure 13:
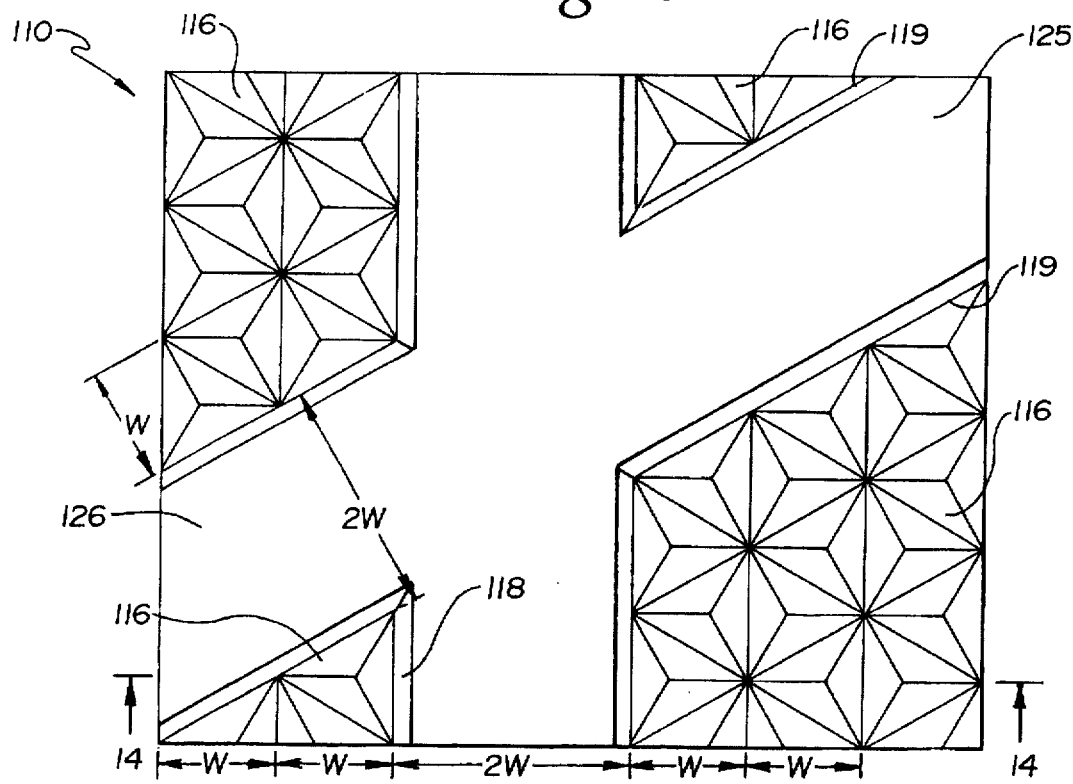
FIG. 13 is a plan view of a directly machinable substrate comprising a plurality of raised sections intersecting at equal heights.
Figure 15:
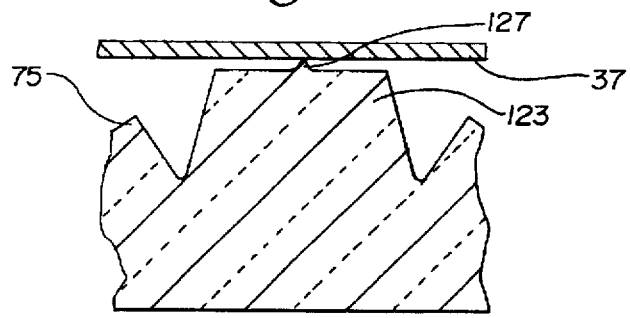
FIG. 15 is a side section view of a precision manufactured raised section and sealing medium, with an ultrasonic energy concentrator shown in the pre-melt configuration.
Figure 16:
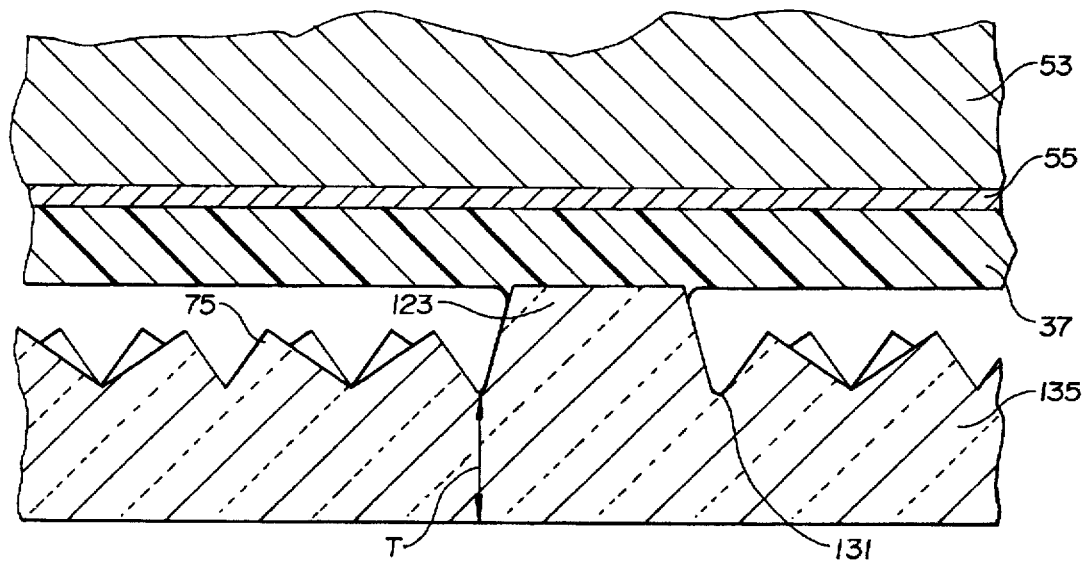
FIG. 16 is a side section view of a structure analogous to that shown in FIG. 13 demonstrating the effect of stress dissipating means preventing separation of cube corner elements from a raised section undergoing stress.

One embodiment of the invention comprises removing parts of the substrate material comprising a replica having at least one zone of geometric structures to form at least two intersecting cavities bounded by side walls in the replica. The intersecting cavities are preferably formed at a depth at least that of the cube corner elements formed by the groove sets. Also, each cavity preferably comprises at least one side wall which extends to a depth into the replica substantially equal to the deepest depth of any other intersecting cavity. FIG. 13 discloses in plan view, and FIG. 14 discloses in section view, an article 110 which is a unitary replica of a unitary initial substrate and which has a single zone 116 and raised sections manufactured according to this process. As shown, two intersecting raised sections 123, 125 are bounded by grooves in groove sets 118, 119 and are machined in article 110 so that the raised sections comprise top portions which are flat and which are precisely manufactured. This optimizes bonding of a sealing medium to the substrate material forming the article. The precise manufacture of uniformly flat tops of raised sections permits use of a range of materials and processes for attaching sealing mediums. For example, FIG. 15 illustrates, in a pre-melt configuration, use of an ultrasonic energy concentrator 127. Some of the advantages of using a sealing method comprising concentrators 127 include use of less adhesive, manufacturing efficiency, and improved durability. In order to gain the advantages it is necessary to precisely and consistently manufacture the raised sections to allow contact of all concentrators 127 with a sealing medium 37. This degree of precision is not attainable using previously known structures and manufacturing methods. FIG. 16 shows the flat, uniform contact of raised section 123 with sealing medium 37 after sonic melting of the energy concentrator 127.

Raised sections 123, 125 preferably have heights which are essentially and consistently equal to within $1.27 \times 10^{-2}$ millimeter (0.5 mil), and preferably to within $7.62 \times 10^{-3}$ millimeter (0.3 mil), and most preferably to within $5.08 \times 10^{-3}$ millimeter (0.2 mil). This results in an article which provides uniform contact of a sealing medium or other substrate, such as signage backings, with the raised sections. This is a particularly important feature at intersection locations of raised sections to prevent any gap between the sealing medium and the raised section which could cause undesired separation of the sealing medium from the raised section. This also reduces the amount of adhesive material in a bonding layer, if any, necessary for bonding a sealing medium to the flat top surfaces of raised sections.

FIG. 13 also discloses raised sections 123, 125 which are highly tailorable to optimize optical performance of the article. For example, the raised sections may be bounded by grooves, and/or the grooves bounding the raised sections may be oriented as parallel to groove sets in zone 116 adjacent to the raised sections. Also, when a raised section is bounded by grooves, then the distance between grooves bounding each raised section is therefor an integral multiple of the distance between grooves in groove sets in the zone surrounding each raised section, providing the groove spacing is constant. This is shown in FIG. 13 in which each raised section 123, 125 has a spacing width 2W between boundary grooves that is twice the spacing width W between grooves in the adjacent zone 116. This results in fewer retroreflective elements which are damaged during the manufacturing process and therefore considerably improves the performance of retroreflective sheetings using this construction.

Figure 14:
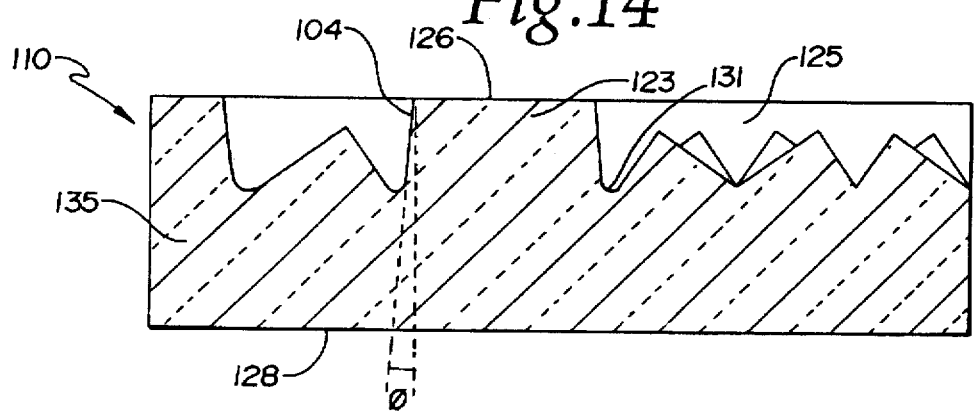
FIG. 14 is a section view taken along lines 14—14 in FIG. 13.

FIG. 14 is a section view of the structure of FIG. 13 which highlights the essentially identical height of raised sections 123 and 125. In addition, FIG. 14 shows one embodiment of raised sections in which the side walls 104 are formed with a taper angle Ø of less than about 30° from a line normal to a base plane 128 of article 110. In some embodiments, a preferred angle is in a range of between about 5° to about 10°. Reduced taper provides a wider raised section top surface 126 while minimizing the number of retroreflective elements which are removed or damaged. This reduced taper also enhances brightness of the article without reducing whiteness.

FIGS. 13 and 14 also disclose stress dissipating means for strengthening the article. As shown in FIG. 14, one embodiment of stress dissipating means comprises a curved surface 131 extending between a raised section, such as section 123, and geometric structures in adjacent zones. Preferably, the curved surface has a radius of at least about 0.254 millimeter (100 micro inches). The curved or radiused surface, in one embodiment, may be formed by cutting the initial cavity in a master or a replica to a depth equal to the base level of the cubes formed or to be formed in the substrate. This type of stress dissipating means reduces the possibility of destructive stress concentrations occurring at these locations, such as shown and discussed in relation to FIG. 8. FIG. 16 discloses another embodiment of stress dissipating means for strengthening an article, such as a retroreflective sheeting. This comprises use of a land 135 having a substantially uniform thickness T of at least 0.0254 millimeter (one mil). This may contribute to greater strength of the sheeting by reducing the stress concentration along the boundaries of cube corners and a support layer by curving the sharp notches at those boundaries. This increases the structural integrity of the sheeting. This increased sheeting strength reduces the likelihood of separation of raised sections from adjoining geometric structures, such as cube corner elements, when undergoing stress.

Figure 17:
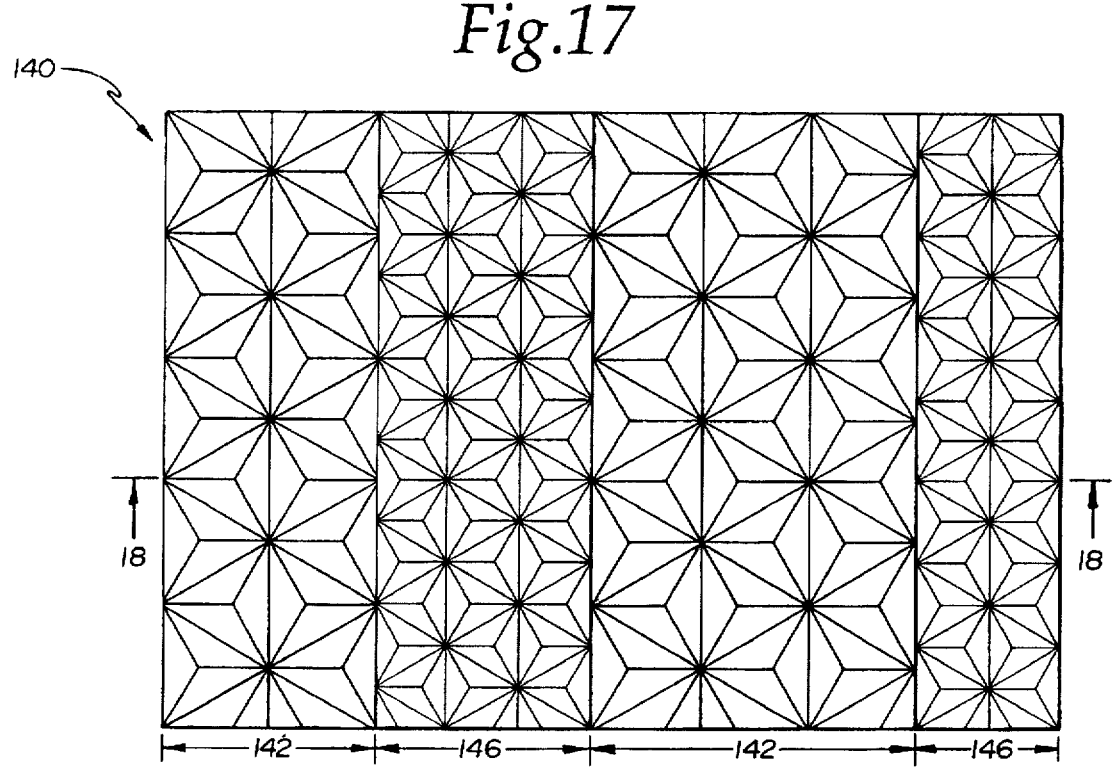
FIG. 17 is a plan view of a directly machined substrate in which a plurality of zones of geometric structures included cube corner elements is shown.
Figure 18:
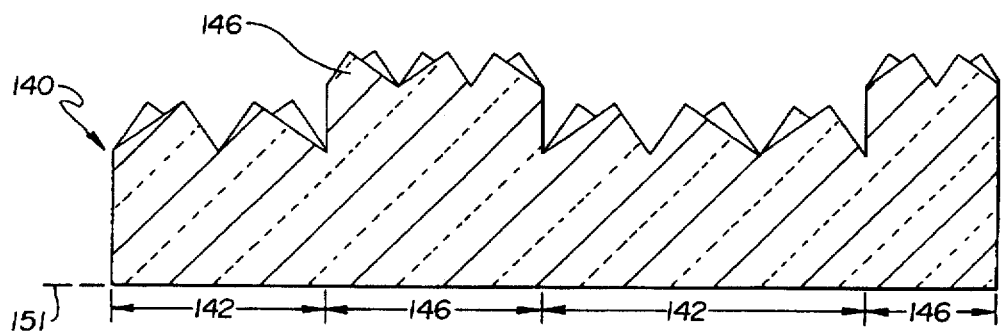
FIG. 18 is a section view taken along lines 18—18 of FIG. 17.
Figure 19:
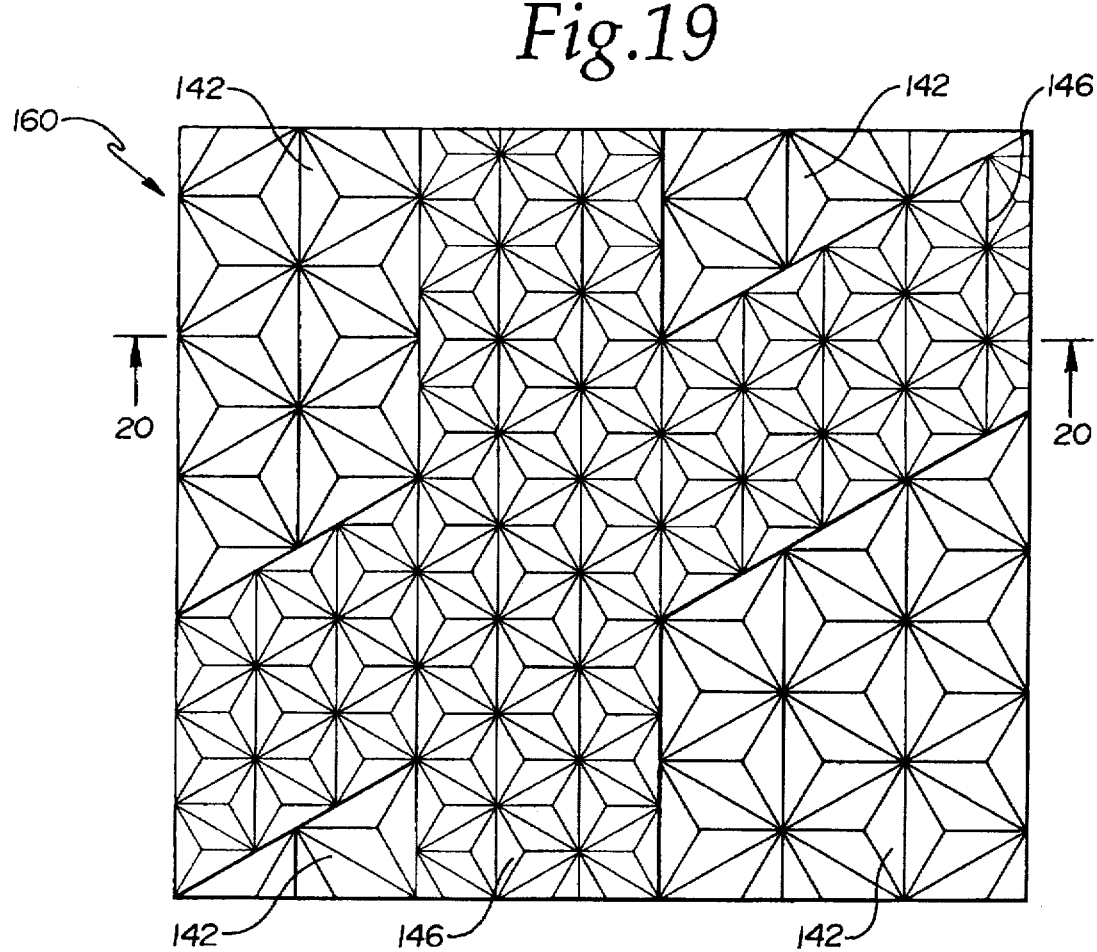
FIG. 19 is a plan view of a directly machined substrate comprising a plurality of zones of geometric structures and intersecting raised zones.
Figure 20:
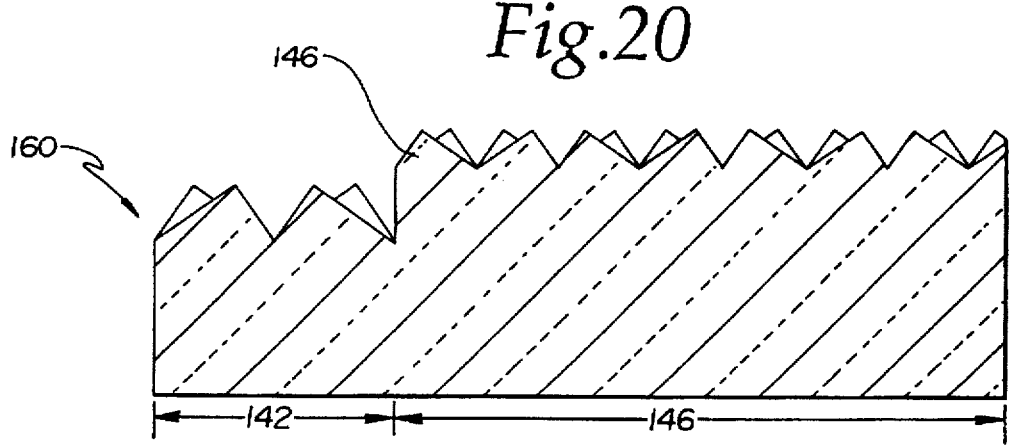
FIG. 20 is a section view taken along lines 20—20 of FIG. 19.

FIG. 17 and FIG. 18 disclose in plan view and section view respectively another embodiment of the invention in which an additional directly machinable unitary substrate 140 comprises zones of cube corner elements including zone 142 and zone 146. Zone 146 may be originally formed as a raised section which is then directly machined using a three groove set pattern. The direct machining of a raised section produces a raised zone, which comprises a plurality of geometric structures including cube corner elements bounded by at least two sets of parallel grooves. In one embodiment, such as that shown in FIG. 18, the bottom of the deepest groove in at least one raised zone 146 is machined to a depth which is higher relative to a common reference plane 151 than the highest structure in any zone which is adjacent to the raised zone. FIG. 19 and FIG. 20 disclose in plan and section view respectively a substrate 160 comprising a plurality of intersecting raised zones 146, also manufactured using a three groove set pattern.

As shown in FIGS. 17–20, at least one of the groove sets in a raised zone are preferably parallel to at least one groove set in zones adjacent to raised zones. Also, the total width of a raised zone is preferably an integral multiple of the distance between grooves in groove sets in zones adjacent to the raised zone. This is achieved, in one embodiment, by creating an initial substrate with a cavity suitable for forming a raised section which is bounded by grooves from a groove set in a first cube corner element array zone. This is particularly useful when the cubes in adjacent zones are the same geometry but different size, i.e. geometrically similar. This results in fewer retroreflective elements which are damaged during the manufacturing process and therefore considerably improves the performance of retroreflective sheetings using this construction. In addition, the machining of raised zones does not initially require machining the surface of a substrate with the same high measure of flatness as when manufacturing raised sections.

Conventional cube corner retroreflective element designs include structural and optical limitations which are overcome by use of these raised structure cube corner retroreflective element structures and methods of manufacture. Use of this new class of retroreflective cube corner element structures and manufacturing methods permits diverse cube corner element shaping. For example, cubes in a single array may be readily manufactured with raised discontinuous geometric structures having different heights or different shapes. Use of these methods and structures also permits manufacture of cube arrays which have highly tailorable optical performance. For example, at many entrance angles, including at zero entrance angle, raised multiple structure arrays outperform conventional arrays by exhibiting higher percent active apertures, multiple active aperture shapes, or by providing improved divergence profiles, or both. Raised multiple structure manufacturing techniques may also produce enhanced optical performance resulting from closely spaced intermixed cubes with different active aperture shapes and sizes. This presents more uniform appearances of raised multiple structure arrays over a wide range of viewing distances under both day and night observation conditions. These advantages of raised multiple structure cube corner elements and zones enhance the usefulness of articles having these features. Such articles include, for example, traffic control materials, retroreflective vehicle markings, photoelectric sensors, directional reflectors, flexible retroreflective arrays, and reflective garments for human or animal use.

As discussed above, many limiting cases of conventional cube corner element design are surpassed through use of raised multiple structure methods of manufacture. In some raised multiple structure designs, such as that shown in substrate 140 in FIG. 17, cube surfaces having some conventional cube geometries may occur as part of a plurality of cube types in a single array. However, the normal limits of conventional cube shapes and performances are not similarly bounded using raised multiple structure methods and structures.

Figure 21:
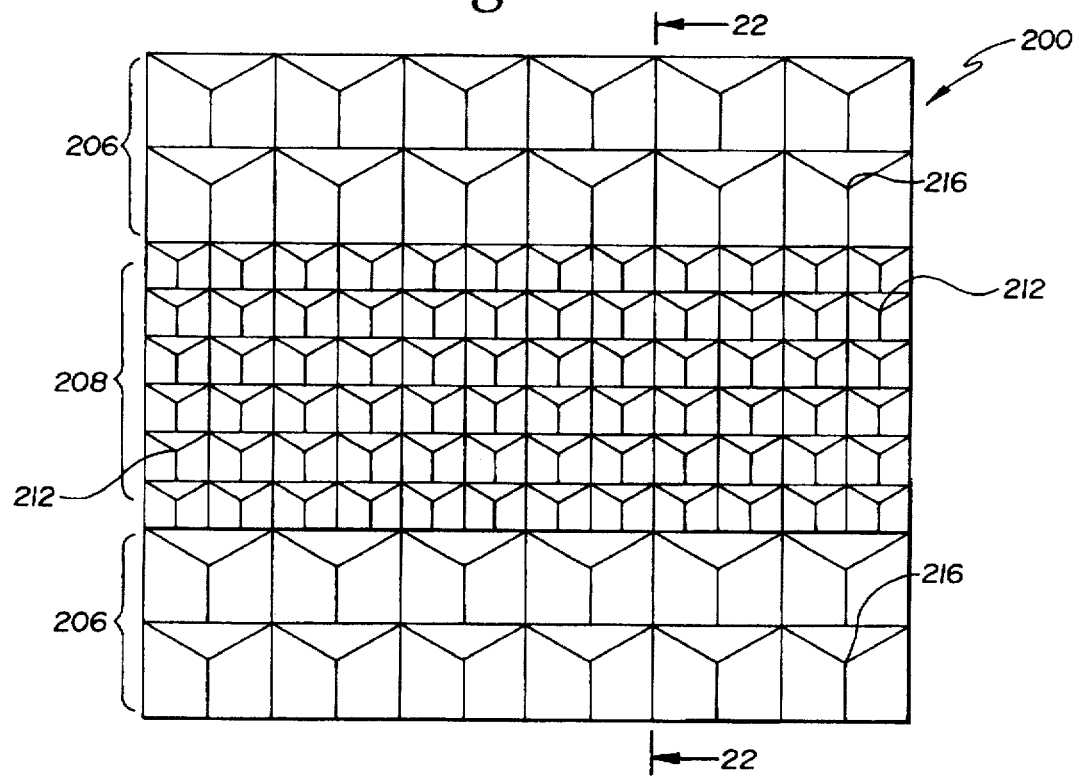
FIG. 21 is a plan view of a directly machined cube corner article which is a replica of a zoned unitary substrate formed by, directly machining a series of unitary substrates.
Figure 22:
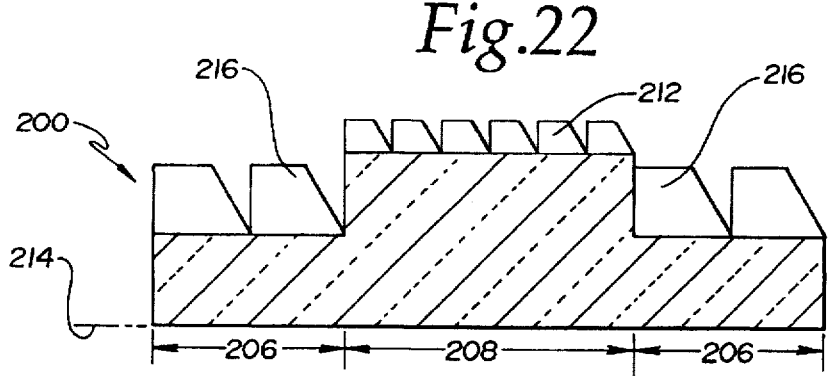
FIG. 22 is a section view taken along lines 22—22 of FIG. 21.

FIG. 21 and FIG. 22 are plan and section views respectively of an alternate embodiment substrate 200, which is a replica of a two groove set directly machined unitary substrate. Substrate 200 comprises a plurality of zones 206, 208 of geometrically similar cube corner elements 212, 216. Substrate 200 includes a raised zone 208 which comprises a plurality of geometric structures including cube corner elements 212 which are a different size and which are at a different height above a common reference plane 214 than cube corner elements 216 in zone 206. Substrate 200 is particularly useful in applications requiring high brightness at high entrance angles such as pavement markers, approach markers, channel markers, roadway dividers, barriers, and similar uses.

Figure 23:
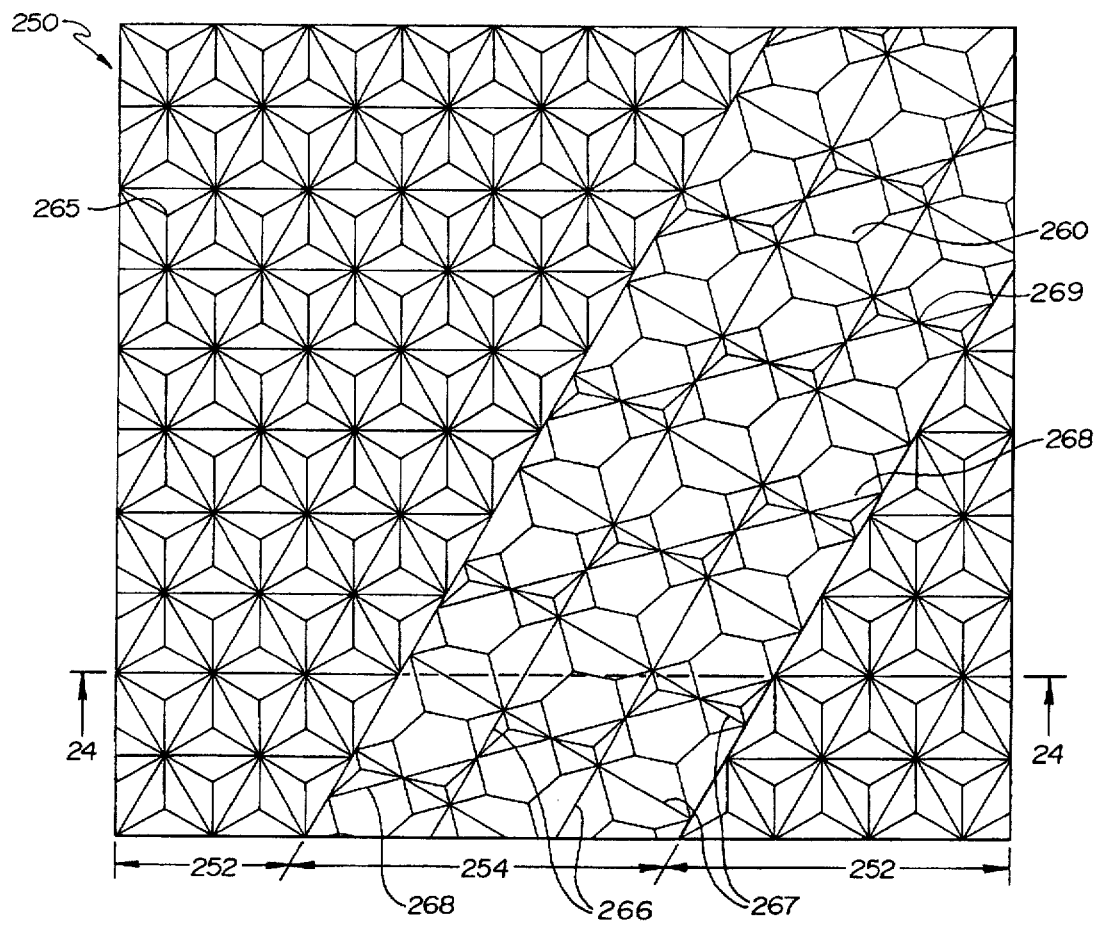
FIG. 23 is a plan view of a directly machined cube corner article comprising a plurality of zones of retroreflective cube corner elements having diverse cube geometry and orientation, including one raised zone.
Figure 24:
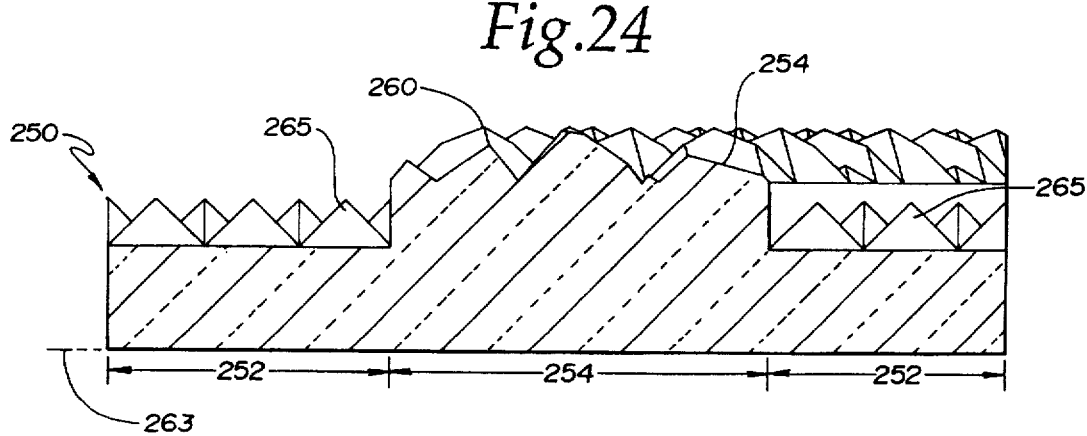
FIG. 24 is a section view taken along lines 24—24 of FIG. 23.

FIG. 23 and FIG. 24 are plan and section views respectively of another alternate embodiment substrate 250, which is a replica of a three groove set directly machined unitary substrate. Substrate 250 comprises a plurality of zones 252, 254, including at least one raised zone. Raised zone 254 comprises a plurality of geometric structures including cube corner elements 260 which are a different size and shape, and are at a different height above a common reference plane 263, than cube corner elements 265 in zone 252. Raised zone 254 is shown with one secondary groove set having directly machined secondary grooves 266 in parallel relation with grooves in an adjacent zone. In this embodiment, two of the grooves in the adjacent zone bound raised zone 254 so that the total width of the raised zone is an integral multiple of the distance between the grooves in the groove set in the zone adjacent to raised zone 254. Another secondary groove set having directly machined secondary grooves 267 is arranged in non-parallel relation with any grooves in adjacent zones. Grooves 268 in a primary groove set are also arranged in non-parallel relation with any grooves in adjacent zones. It is recognized that any of the grooves may be designated for parallel alignment with grooves in an adjacent zone, depending on the desired orientation. This permits orientation of cube corner elements 260 in virtually any manner to optimize optical performance, however, this is accomplished without damage to any structures in adjacent zone 252.

FIG. 23 further discloses a raised multiple structure cube array 250 having at least one zone 254 in which primary grooves 268 do not pass through the secondary grooves 266, 267 at the mutual intersection locations 269 of the secondary grooves. Primary grooves 268 are equally spaced and centered on secondary groove intersection locations 269. Array 250 presents yet another novel feature of raised multiple structure cube corner technology. In particular, a method is disclosed for manufacturing a cube corner article by directly machining three non-parallel non-mutually intersecting sets of grooves. Preferably, these sets intersect at included angles less than 90°. It is recognized that certain machining imprecisions may create minor, unintentional separation between grooves at intersections. However, this aspect of the invention involves intentional and substantial separation. For example, a separation distance between the intersections of the grooves within two groove sets with at least one groove in a third groove set which is greater than about 0.01 millimeter would likely provide the advantages of this feature. However, the precise minimum separation distance is dependent on the specific tooling, substrate, process controls, and the desired optical performance sought.

Non-mutually intersecting groove sets create multiple geometric structures including individual cube corner elements with different active aperture sizes and shapes. Entire arrays, such as array 250, may even be formed with cube corners created by a combination of mutually and non-mutually intersecting groove sets. The position of the groove sets is controlled to produce maximum total light return over a desired range of entrance angles. Also the distance between grooves in at least one groove set might not be equal to the distance between grooves in at least another of the groove sets. It is also possible to machine at least one set of parallel grooves into a substrate in a repeating fashion with the set comprising a distance between grooves which is optionally variable at each machining of the set. Also, a portion of any one of the grooves may be machined to a depth that is different from at least one other groove depth.

Figure 25:
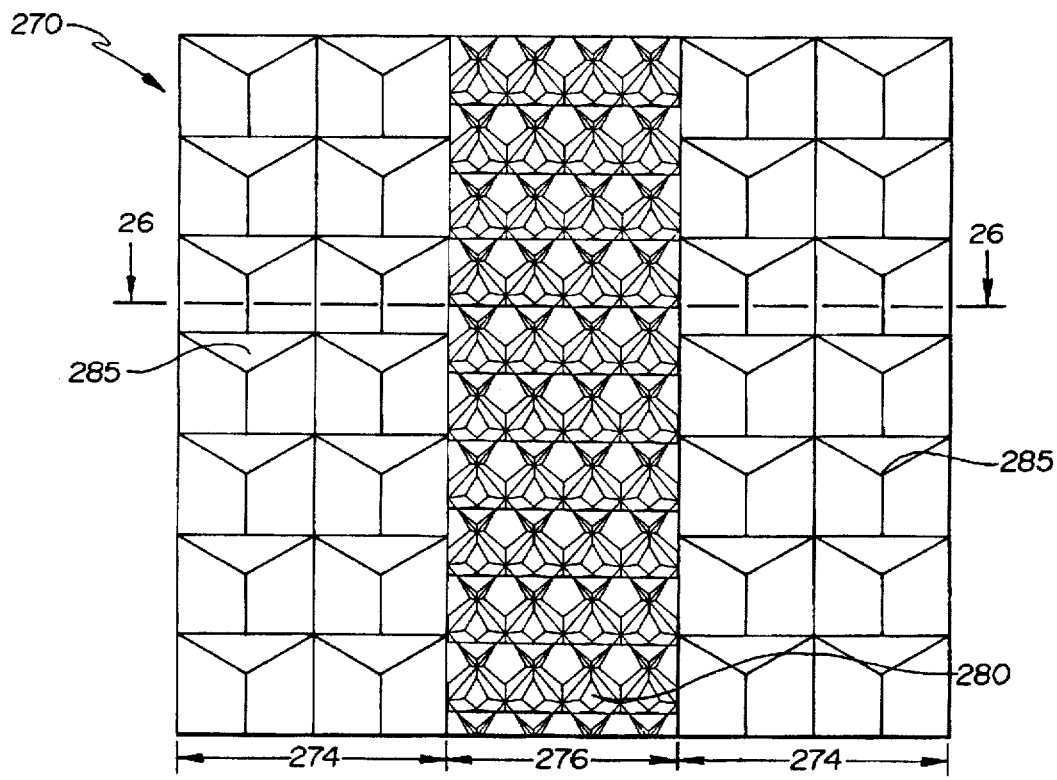
FIG. 25 is a plan view of a directly machined cube corner article comprising a plurality of zones of retroreflective elements having different geometries, including at least one raised zone.
Figure 26:
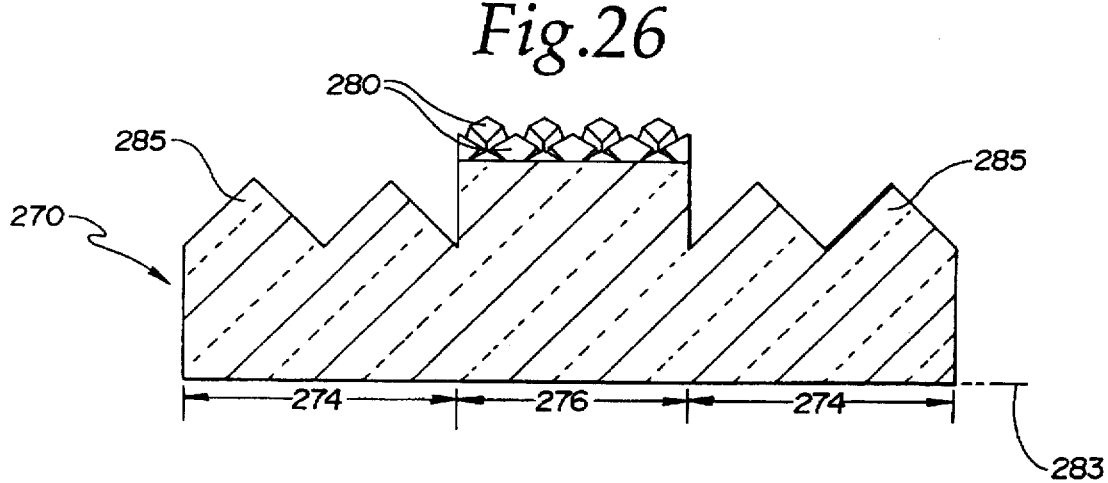
FIG. 26 is a section view taken along lines 26—26 of FIG. 25.

FIG. 25 and FIG. 26 are plan and section views respectively of another alternate embodiment substrate 270, which is a replica of a mixed two groove set and three groove set directly machined unitary substrate. Substrate 270 comprises a plurality of zones 274, 276, including at least one raised zone. Raised zone 276 comprises a plurality of geometric structures including cube corner elements 280 which are a different size and shape, and are at a different height above a common reference plane 283, than cube corner elements 285 in zone 274. Indeed, raised zone 276 comprises grooves which are machined to a depth which is higher relative to common reference plane 283 than the highest structure, e.g. cubes 285, in the adjacent zone 274. Substrate 270 comprises cube corner elements which are specifically tailored to provide peak light return at high entrance angles, although other combinations are also useful.

Figure 27:
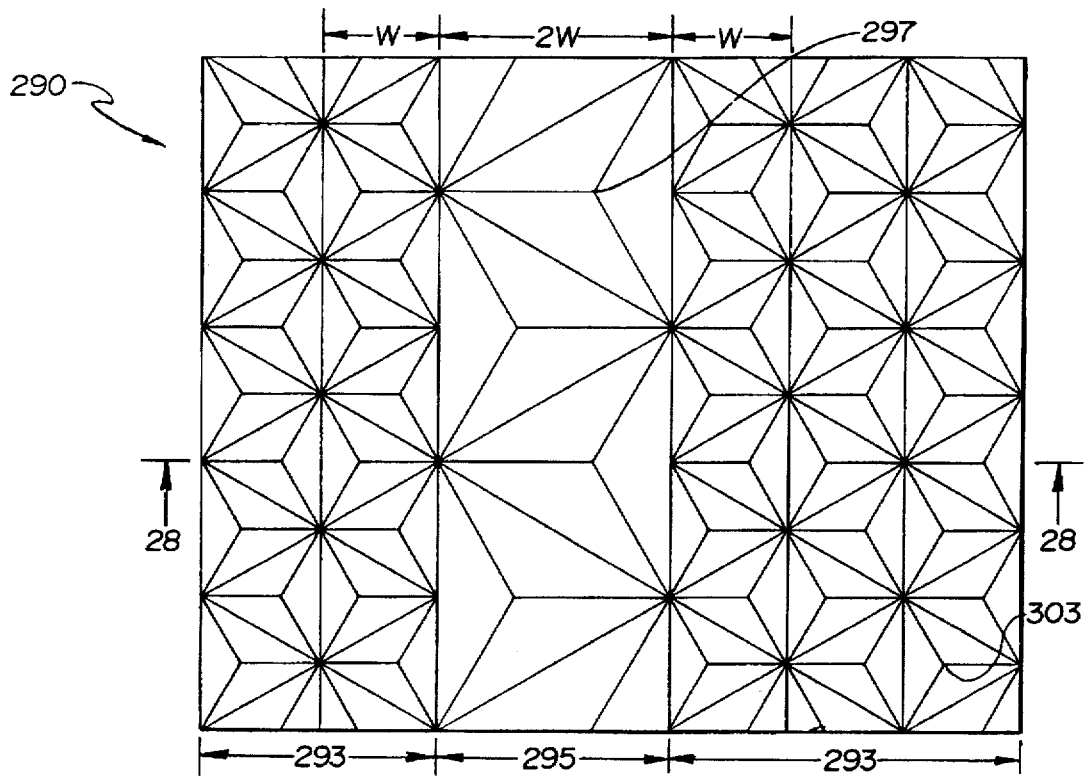
FIG. 27 is a plan view of a directly machined cube corner article comprising a plurality of zones of geometric structures including retroreflective cube corner elements, including one zone comprising cube corner elements having heights greater than cube corner elements in adjacent zones.
Figure 28:
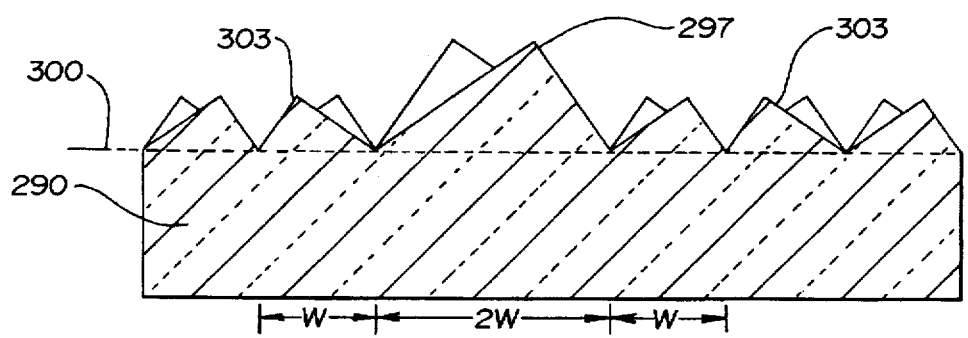
FIG. 28 is a section view taken along lines 28—28 of FIG. 27.

FIG. 27 and FIG. 28 are plan and section views respectively of another alternate embodiment substrate 290, which is a replica of a directly machined unitary substrate. Substrate 290 comprises a plurality of zones 293, 295, including at least one raised zone. Raised zone 295 comprises a plurality of geometric structures including cube corner elements 297. Cube corner elements 297 and cube corner elements 293 share a common base reference plane 300, which aids considerably in processing the article. Cube corner elements 297 are a different size, and have peaks at a different height above a common reference plane 300, than cube corner elements 303 in zone 293. Substrate 290 comprises certain structures that are higher than others to help minimize damage to cubes during processing and handling of the replica. FIG. 27 and FIG. 28 show spacing W between grooves in groove sets in zones adjacent to the raised zone, and the corresponding spacing 2W between grooves in groove sets in the raised zone. It is desirable to use this machining method which results in an article having raised zones with directly machined cube corner elements having spacings between grooves in groove sets in the raised zones that are at integral multiples of the groove spacing of grooves in groove sets in areas adjacent the raised zones. This manufacturing innovation permits significant reduction and/or elimination of damage to optical structures adjacent to the raised zones.

Variable groove spacing within any groove set may also be used to produce raised multiple structure cube arrays with additional beneficial features. In such cases, the spacing of the primary grooves within a groove set relative to the secondary groove intersections is varied in a repeating pattern throughout array. A wide range of aperture sizes and shapes will result in this array, with a corresponding improvement in the uniformity of the return energy pattern or divergence profile of the retroreflected light due to diffraction. Proper placement of grooves can be utilized advantageously during design to provide optimum product performance for a given application. Another beneficial feature includes manufacture of a raised zone having cuber corner elements which are of substantially identical shapes to cube corner elements in portions of the array adjacent to the raised zone, but with the raised zone cube corner elements exhibiting different optical performance than cube corner elements in the adjacent portions of the array.

Figure 29:
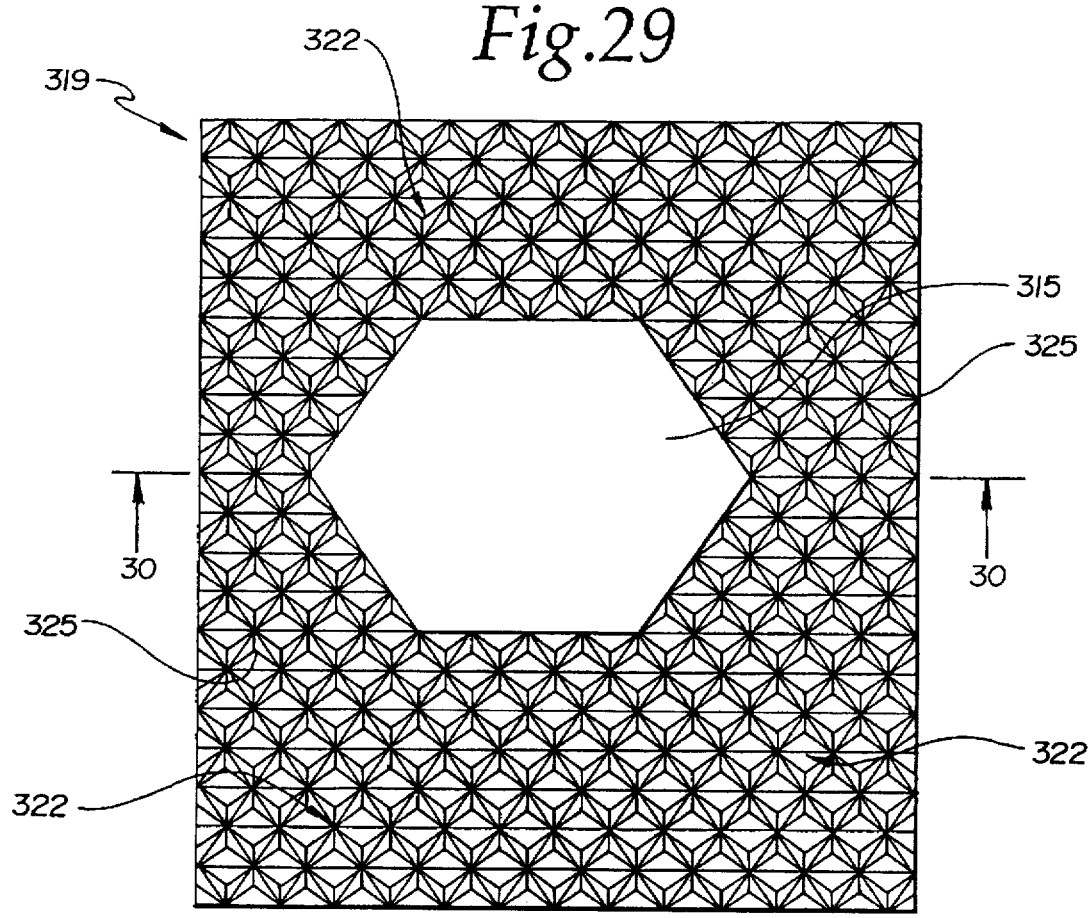
FIG. 29 is a plan view of a directly machined cube corner article comprising a plurality of retroreflective cube corner elements and one raised section.
Figure 30:
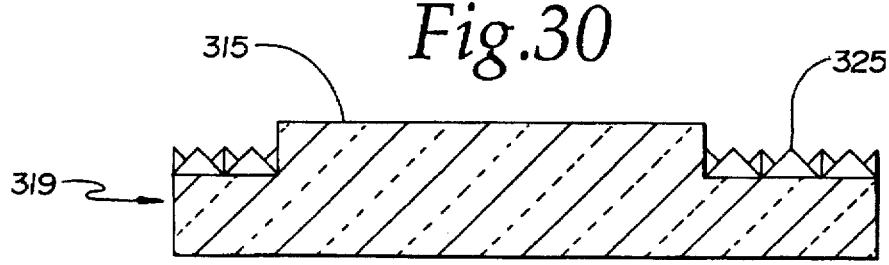
FIG. 30 is a section view taken along lines 30—30 of FIG. 29.

Raised sections and raised zones may be manufactured in different shapes using the methods of this invention, as shown in FIG. 29 and FIG. 30, in which a six sided raised section 315 is formed in substrate 319. Raised section 315 is surrounded by zone 322 having a plurality of cube corner elements 325. Raised section 315 is manufactured by replicating a modified replica of an initial unitary substrate. Part of the substrate material in the modified replica is removed to form at least one cavity. The cavity is formed using any known technique, such as electrical-discharge machining, photo-etching, or other precision techniques. The cavity is bounded by side walls in the replica at a depth at least that of the cube corner elements formed by the groove sets in adjacent areas. The replica is then replicated to produce a cube corner article comprising a zone 322 and at least one raised section 315 having side walls at a height at least that of the height of cube corner elements formed in the adjacent zone.

Figure 31:
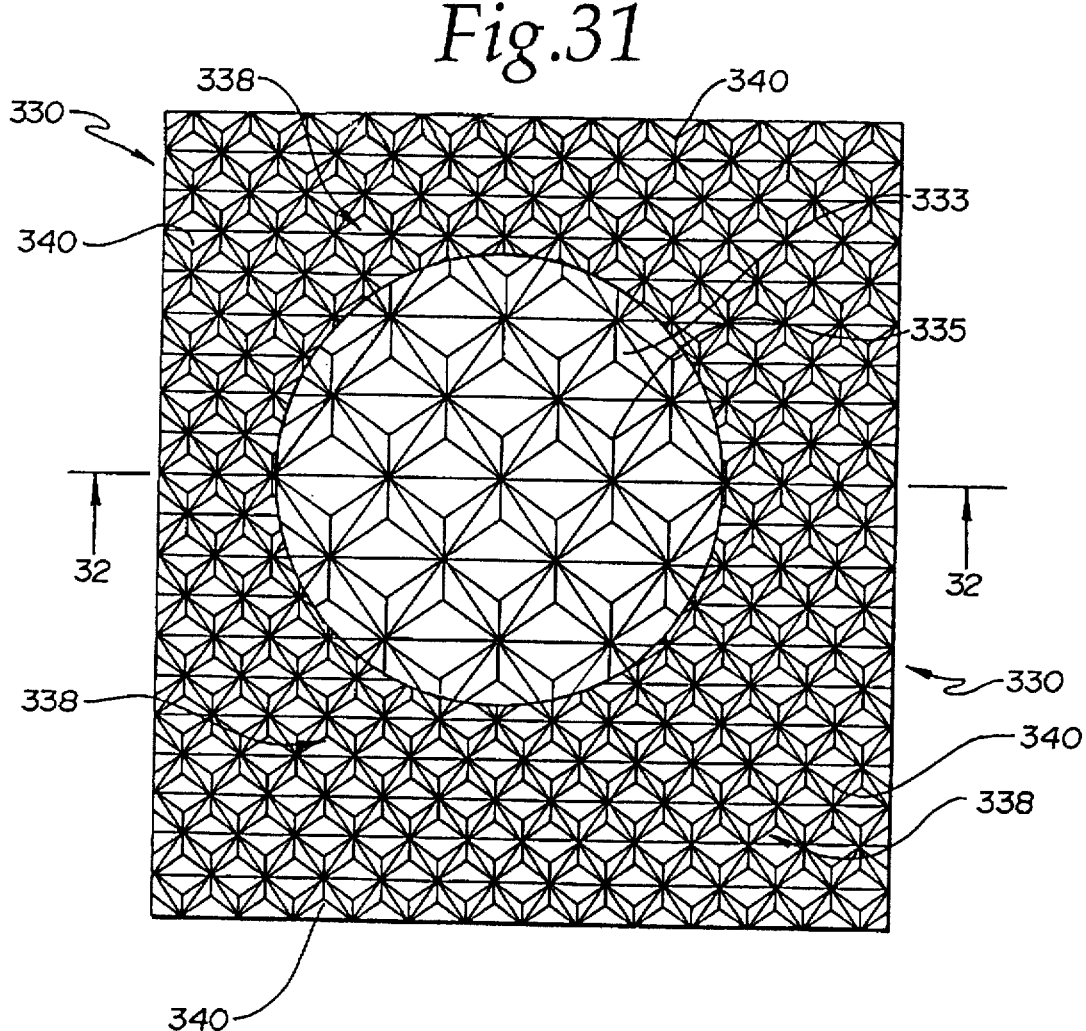
FIG. 31 is a plan view of a directly machined cube corner article comprising a plurality of zones of geometric structures including retroreflective cube corner elements, and one raised zone comprising cube corner elements having peaks higher than cube structures in adjacent zones.
Figure 32:
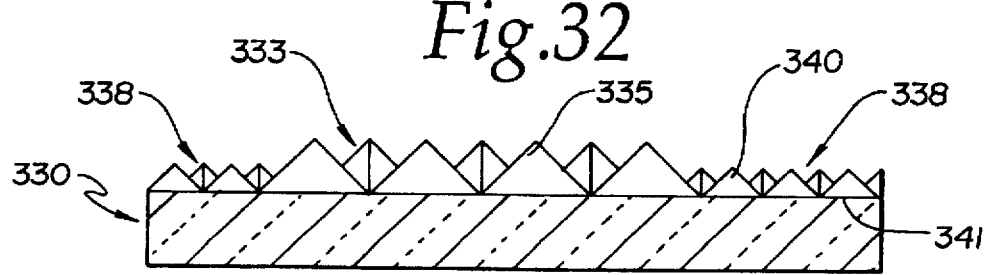
FIG. 32 is a section view taken along lines 32—32 of FIG. 31.

FIG. 31 and FIG. 32 disclose a raised zone article similar to the raised section article shown in FIG. 29 and FIG. 30, but with a raised zone shape which is not bounded by a groove in a groove set. Substrate 330 comprises a raised zone 333 having a plurality of geometric structures including cube corner elements 335. The raised zone is surrounded by adjacent zone 338 having a plurality of cube corner elements 340. In the embodiment of FIGS. 31–32, cube corner elements 335, 340 are geometrically similar. It is recognized, however, that cube corner elements in the zones may have diverse geometries and orientations to control optical performance characteristics and may be positioned at different heights relative to common reference plane 341. The invention permits numerous combinations of structures previously unknown and not possible within the art of retroreflective cube corner element design and manufacturing technologies.

Figure 33:
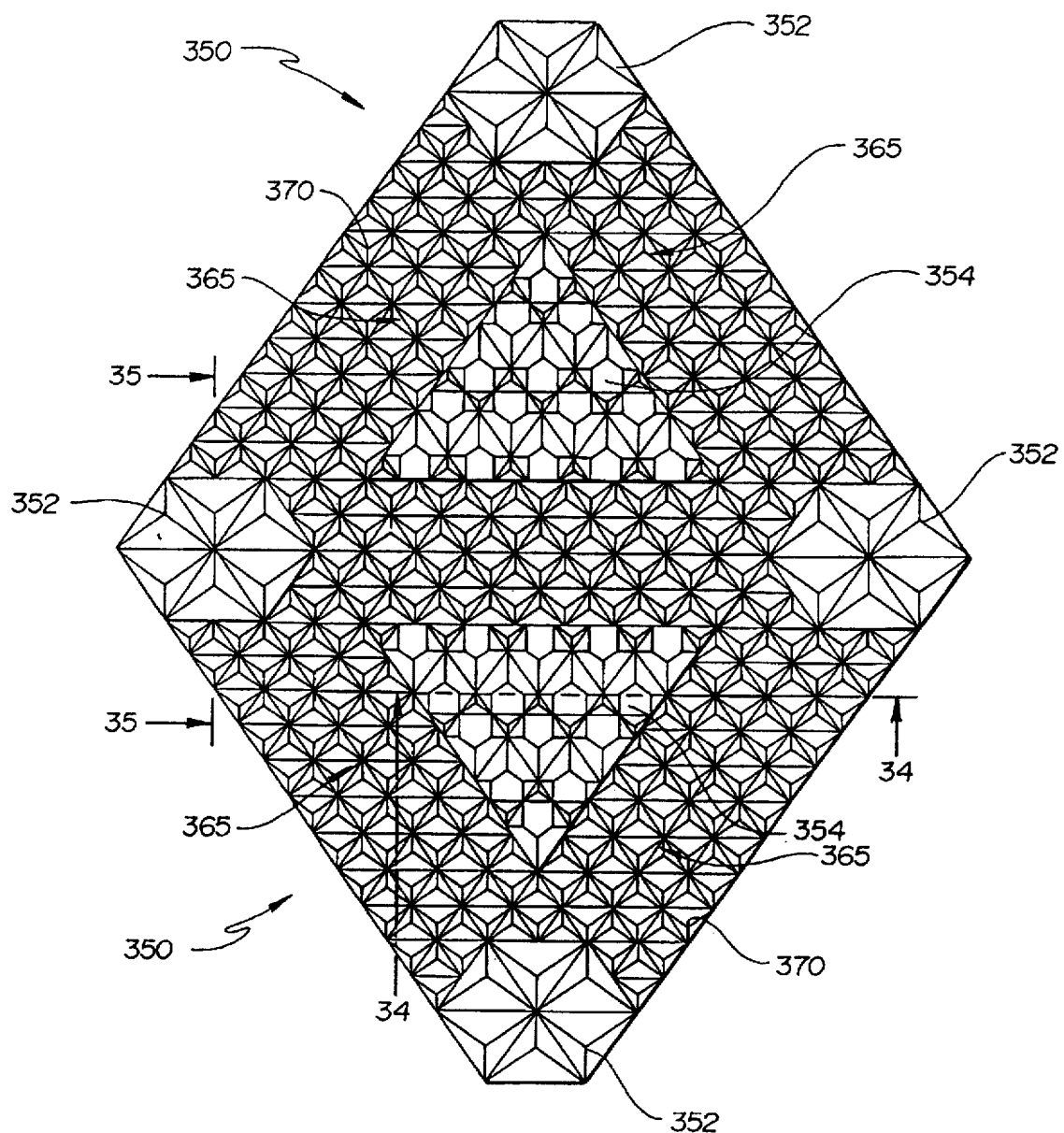
FIG. 33 is a plan view of a directly machined cube corner article comprising a plurality of zones of geometric structures including retroreflective cube corner elements, and a plurality of multiple non-interfering raised zones.
Figure 34:
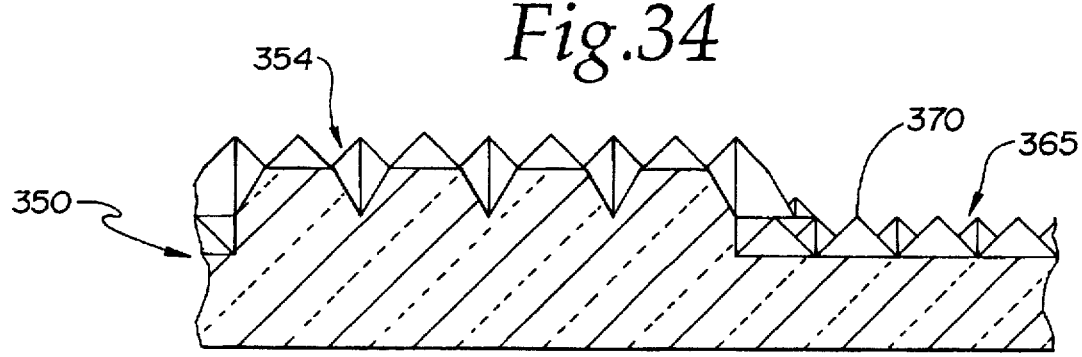
FIG. 34 is a section view taken along lines 34—34 of FIG. 33.
Figure 35:
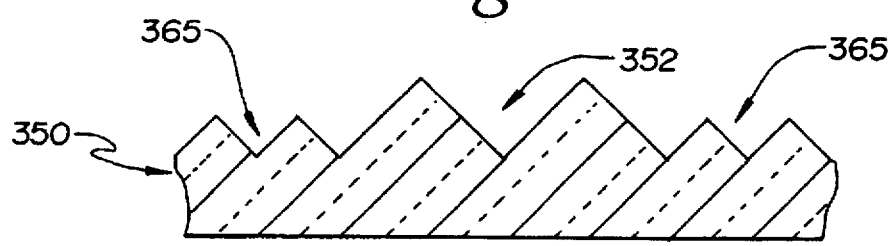
FIG. 35 is a section view taken along lines 35—35 of FIG. 33.

FIGS. 33–35 disclose views of substrate 350, which is a replica of a directly machined unitary substrate, in which there is formed a plurality of both different and repeating patterns of geometric structures including cube corner elements in multiple independent discontinuous raised zones 352, 354. A portion of a zone may be separated from another portion of the zone by other structures such as a raised section or a raised zone. All portions of a zone should be manufactured at the same time and must not interfere with the machining of any other raised structure. This multiple independent zone capability effectively reduces the number of replication cycles necessary to produce arrays having greater than two zones. The raised zones are bordered by an adjacent zone 365 having a plurality of cube corner elements 370.

Figure 36:
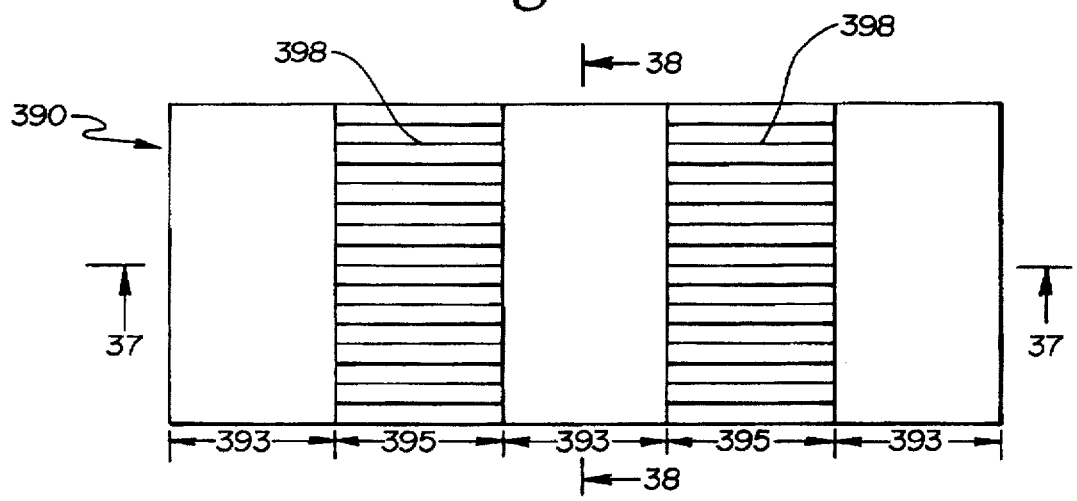
FIG. 36 is a plan view of an initial directly machinable substrate in which a plurality of geometric structures have been formed by directly machining one set of parallel grooves in the substrate.
Figure 39:
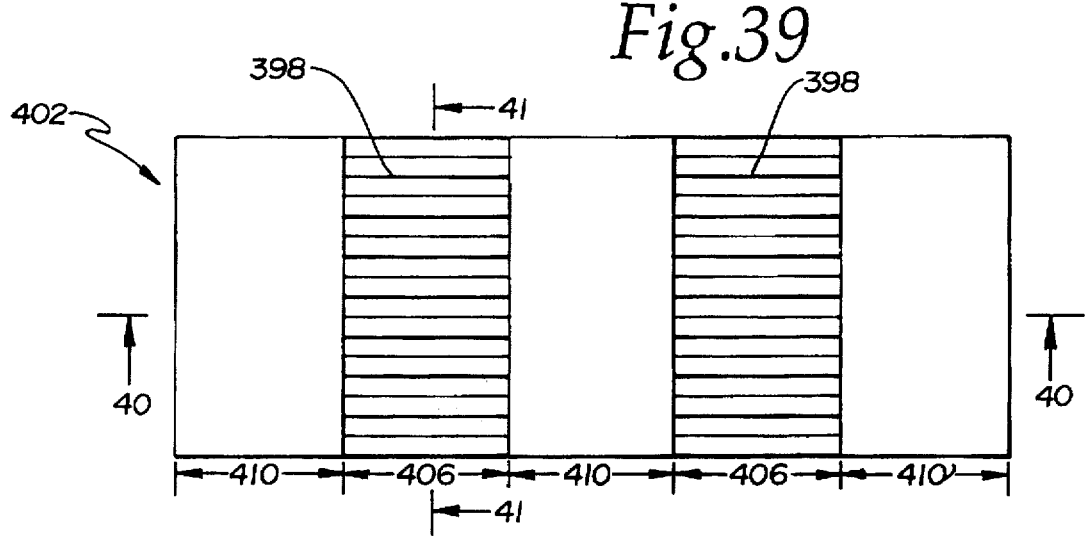
FIG. 39 is a plan view of a replica of the substrate of FIG. 36.
Figure 37:
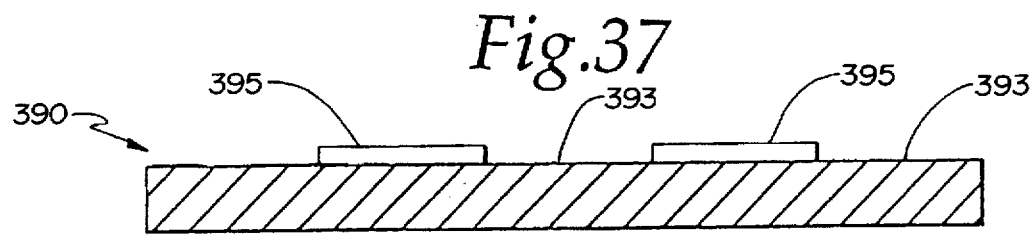
FIG. 37 is a section view taken along lines 37—37 of FIG. 36.
Figure 38:
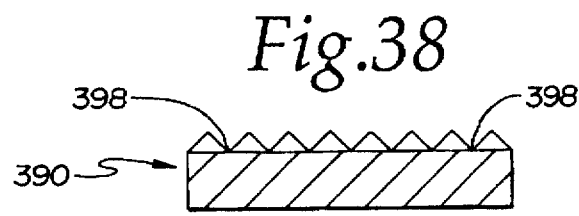
FIG. 38 is a section view taken along lines 38—38 of FIG. 36.
Figure 40:
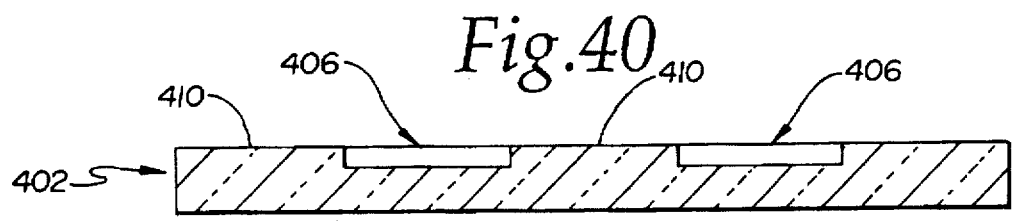
FIG. 40 is a section view taken along lines 40—40 of FIG. 39.
Figure 41:
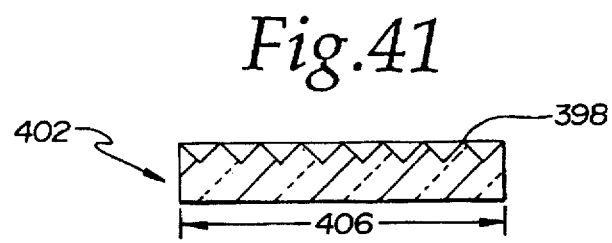
FIG. 41 is a section view taken along lines 41—41 of FIG. 39.

FIGS. 36–38 disclose an initial unitary substrate 390 in which one initial groove set 398 is machined in initial raised areas 395. Substrate 390 may either have initial recessed areas 393 or it may require forming these areas after machining groove set 398. FIGS. 39–41 disclose views of a replica 402 of machined substrate 390. In replica 402, the features of substrate 390 are inverted so that the grooves formed by groove set 398 are now peaks in a zone 406, which is lower than adjacent zone 410.

Figure 42:
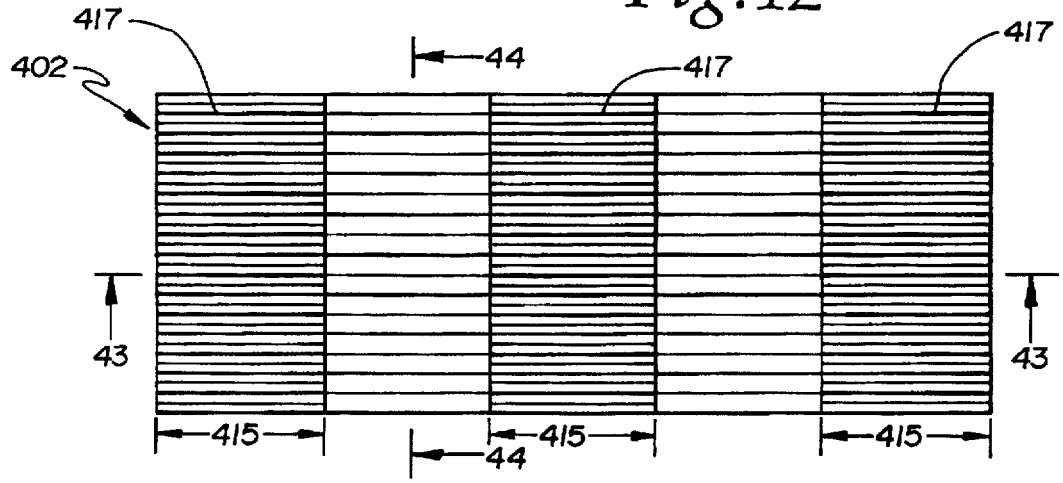
FIG. 42 is a plan view of the replica article shown in FIG. 39, comprising additional grooves formed in raised sections within the orientation of the initial groove set.
Figure 43:
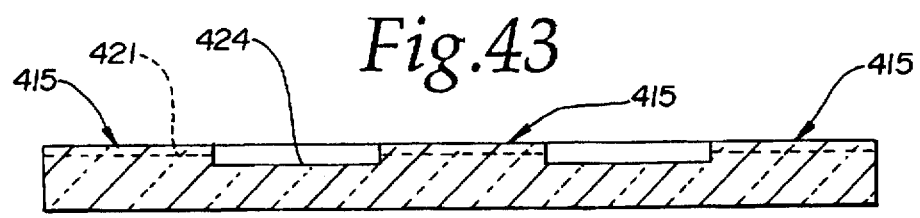
FIG. 43 is a section view taken along lines 43—43 of FIG. 42.
Figure 44:
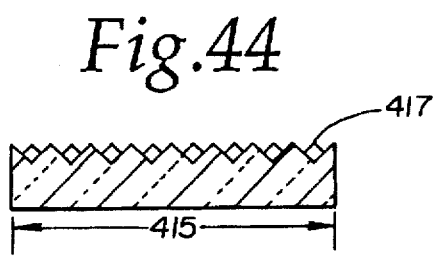
FIG. 44 is a section view taken along lines 44—44 of FIG. 42.
Figure 45:
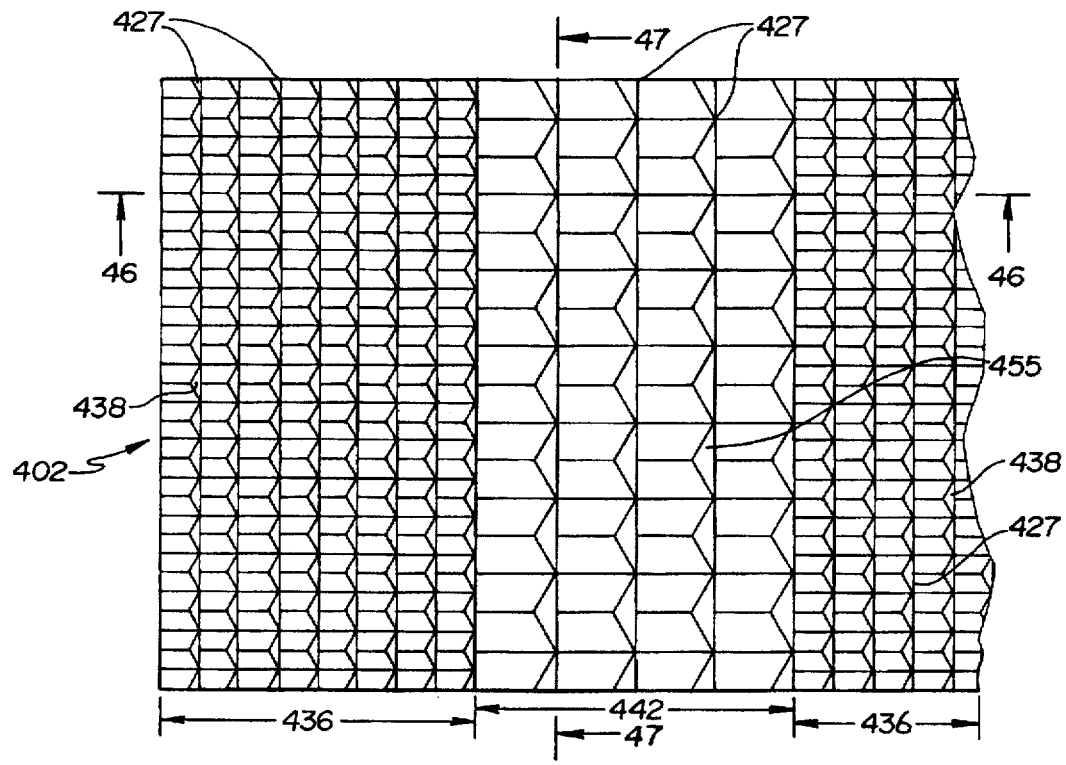
FIG. 45 is a plan view of a directly machined two groove set cube corner article comprising a plurality of zones of retroreflective cube corner elements.
Figure 46:
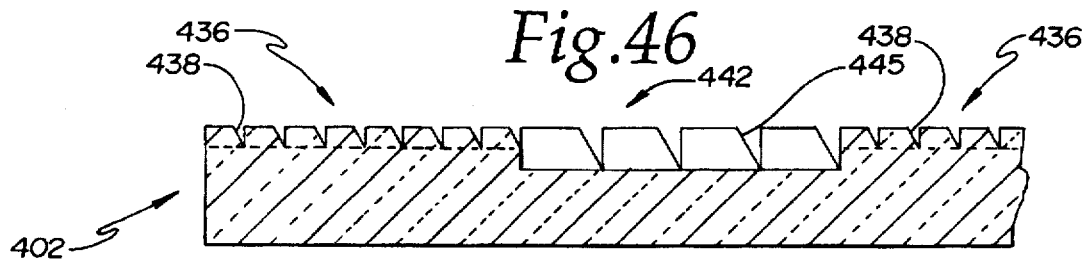
FIG. 46 is a section view taken along lines 46—46 of FIG. 45.
Figure 47:
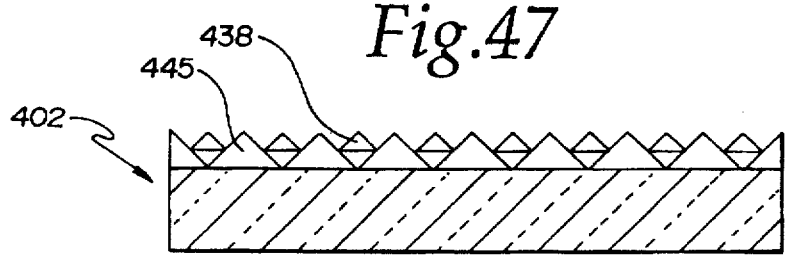
FIG. 47 is a section view taken along lines 47—47 of FIG. 45.

FIGS. 42–44 disclose substrate 402 which is further machined with additional grooves 417 to produce a plurality of machined raised sections 415. Machined raised sections 415 each have structures which share a base plane 421 which is higher than the base plane 424 of the similar structures in adjacent zones. Also, the peak height of structures in adjacent zones is the same. This is also shown in FIG. 46. FIGS. 45–47 each disclose substrate 402 which is further machined with an additional groove set comprising a plurality of grooves 427 to form zones of cube corner elements. Zone 436 comprises cube corner elements 438, and zone 442 comprises cube corner elements 445. The method disclosed in FIGS. 36–47 produces the zoned cube corner articles of FIGS. 45–47 using only one replication step.

Figure 48:
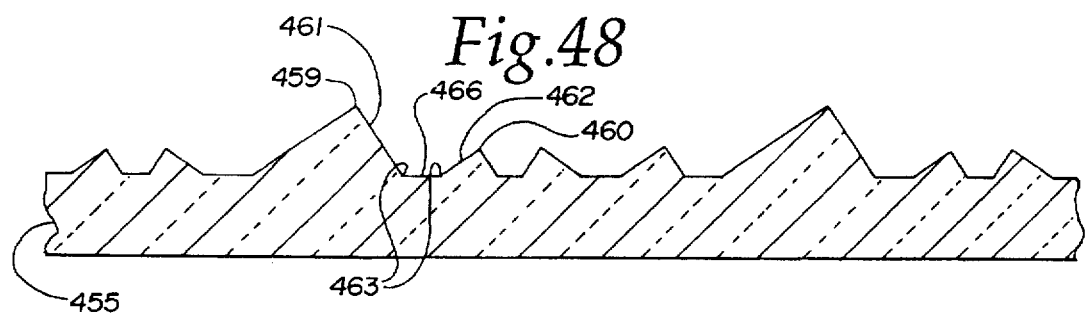
FIG. 48 is a section view of a directly machined cube corner article having a plurality of zones of geometric structures including raised zones and cube corner elements which form boundary edges of separation surfaces.

FIG. 48 discloses a section view of a substrate 455, manufactured as described above as a replica of an initial directly machined unitary substrate. Substrate 455 comprises zones of geometric structures including cube corner elements having different heights and different geometries. FIG. 48 shows a plurality of geometric structures, such as structures 459, 460, each comprising a lateral face 461, 462 formed by a groove in a groove set. In at least one zone, lateral faces of the geometric structures form boundary edges 463 of a separation surface 466. The lateral faces may include cube corner element optical surfaces as well as non-optical surfaces on cube corner or other geometric structures. A separation surface 466 may have flat or curved portions when viewed in cross section.

Other embodiments of this method include creation of an article, or replicas of the article, which further modify the shape of the retroreflected light pattern. These embodiments comprise at least one groove side angle in at least one set of grooves which differs from the angle necessary to produce an orthogonal intersection with other faces of elements defined by the groove sides. Similarly, at least one set of grooves may comprise a repeating pattern of at least two groove side angles that differ from one another. Shapes of grooving tools, or other techniques, may create cube corner elements in which at least a significant portion of at least one cube corner element optical face on at least some of the cubes are arcuate. The arcuate face may be concave or convex. The arcuate face, which was initially formed by one of the grooves in one of the groove sets, is flat in a direction substantially parallel to said groove. The arcuate face may be cylindrical, with the axis of the cylinder parallel to said groove, or may have a varying radius of curvature in a direction perpendicular to said groove.

Raised multiple structure geometries are particularly beneficial for use in applications requiring retroreflective sheeting having substantial total light return, such as traffic control materials, retroreflective vehicle markings, photoelectric sensors, signs, internally illuminated retroreflective articles, reflective garments, and retroreflective markings. The enhanced optical performance and design flexibility resulting from raised multiple structure techniques and concepts relates directly to improved product performance, cost efficiencies, and marketing advantage.

Total light return for retroreflective sheeting is derived from the product of percent active aperture and retroreflected light ray intensity. For some combinations of cube geometries, entrance angles, and refractive index, significant reductions in ray intensity may result in relatively poor total light return even though percent active aperture is relatively high. One example is retroreflective cube corner element arrays which rely on total internal reflection of the retroreflected light rays. Ray intensity is substantially reduced if the critical angle for total internal reflection is exceeded at one of the cube faces. Metallized or other reflective coatings on a portion of an array may be utilized advantageously in such situations. For example, a particular raised zone which has cube surfaces contacting a sealing medium will often be more reflective when the surfaces have a reflective coating. Alternately, a portion may comprise an entire array.

Separation surfaces may be advantageously utilized to increase light transmission or transparency in sheeting, including flexible sheeting, utilizing raised structure or multiple zone retroreflective cube corner element arrays. For example, this is particularly useful in internally illuminated retroreflective articles such as signs or automotive signal light reflectors, which are normally manufactured using injection molding.

Retroreflective directly machined cube corner articles are often designed to receive a sealing film which is applied to the retroreflective article in order to maintain a low refractive index material, such as air, next to the retroreflective elements for improved performance. In conventional arrays this medium is often placed in direct contact with the cube corner elements in ways which degrade total light return. However, using raised multiple structure constructions, a sealing medium may be placed on the highest surface of the array without contacting and degrading the optical properties of lower retroreflective cube corner elements. The highest surface may comprise cube corner elements, non-retroreflective pyramids, frustums, posts, or other structures. Although slight height variations may result from slight non-uniformity of groove positions or included angle of cube corner elements due to machining tolerances or intentional inducement of non-orthogonality, these variations are not analogous to the variations disclosed and taught in this invention. For arrays using a sealing medium, the highest surfaces may be truncated both to hold the medium above the cube corner elements as well as to increase the light transmissivity of the sheeting. Light transmissivity of the sheeting may be increased through use of a transparent or partially transparent sealing medium.

Figure 49:
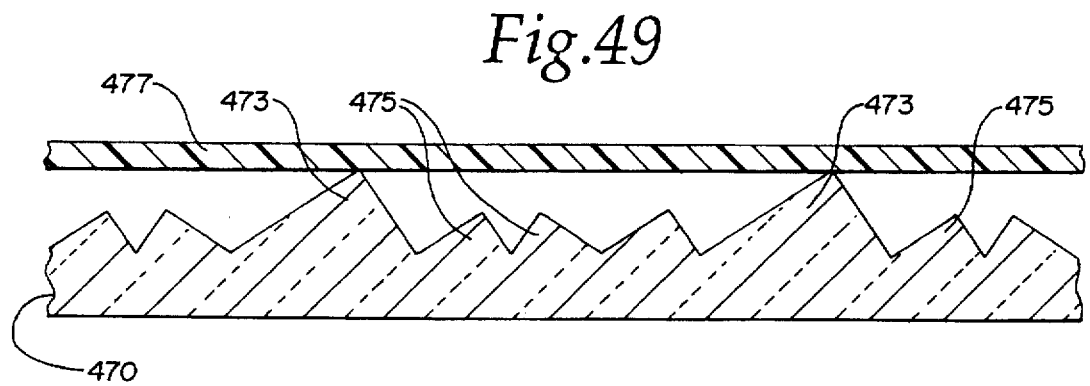
FIG. 49 is a section view of a directly machined cube corner article comprising a plurality of zones of geometric structures including raised zones suitable for holding a sealing medium above geometric structures in at lease one other zone.
Figure 50:
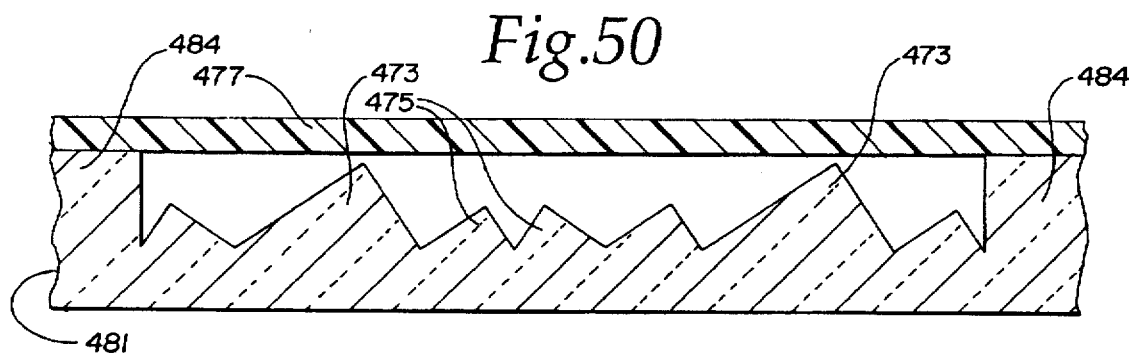
FIG. 50 is a section view of a directly machined cube corner article comprising a plurality of raised zones and including a plurality of raised sections suitable for holding a sealing medium above zones comprising retroreflective surfaces of geometric structures.

Articles manufactured according to the methods of this invention are useful for minimizing the contact of a sealing medium with retroreflective cube corner elements. FIG. 49 discloses one embodiment of a substrate 470 having a plurality of zones of geometric structures including cube corner elements. A first zone comprises cubes 473 which have a height above cubes 475 in another zone. The taller geometric structures, such as cubes 473, provide support for a sealing medium 477 spaced above the lower geometric structures. In similar fashion, FIG. 50 shows substrate 481 which, in addition to the geometric structures shown in FIG. 49, also comprises raised sections 484. Raised sections 484 are suitable for supporting sealing medium 477 above all other geometric structures including cube corner elements 473, 475. Raised sections 484 may also be advantageously utilized to increase light transmission or transparency in sheeting.

Suitable materials for retroreflective articles or sheeting of this invention are preferably transparent materials which are dimensionally stable, durable, weatherable, and easily replicated into the desired configuration. Examples of suitable materials include glass; acrylics, which have an index of refraction of about 1.5, such as Plexiglas brand resin manufactured by Rohm and Haas Company; polycarbonates, which have an index of refraction of about 1.59; reactive materials such as taught in U.S. Pat. Nos. 4,576,850, 4,582, 885, and 4,668,558; polyethylene based ionomers, such as those marketed under the brand name of SURLYN by E. I. Dupont de Nemours and Co., Inc.; polyesters, polyurethanes; and cellulose acetate butyrates. Polycarbonates are particularly suitable because of their toughness and relatively higher refractive index, which generally contributes to improved retroreflective performance over a wider range of entrance angles. These materials may also include dyes, colorants, pigments, UV stabilizers, or other additives. Transparency of the materials ensures that the separation or truncated surfaces will transmit light through those portions of the article or sheeting.

The incorporation of raised sections and/or separation surfaces does not eliminate the retroreflectivity of the article, but rather it renders the entire article partially transparent. In some applications requiring partially transparent materials, low indices of refraction of the article will improve the range of light transmitted through the article. In these applications, the increased transmission range of acrylics (refractive index of about 1.5) is desirable.

In fully retroreflective articles, materials having high indices of refraction are preferred. In these applications, materials such as polycarbonates, with refractive indices of about 1.59, are used to increase the differences between the indices of the material and air, thus increasing retroreflection. Polycarbonates are also generally preferred for their temperature stability and impact resistance.

Various modifications and alterations of this invention will become apparent to those skilled in the art without departing from the scope and spirit of this invention.

What is claimed:

1. A retroreflective sheeting, comprising:
   a substantially optically transparent substrate having a base surface disposed in a base plane and a structured surface opposite the base surface, the structured surface including:
   a first array of cube corner elements formed by at least two sets of intersecting grooves in the substrate;
   a second array of cube corner elements formed by at least two sets of intersecting grooves in the substrate;
   a raised structure extending between the first array and the second array characterized in that the raised structure extends parallel to and is bounded by two grooves on the structured surface; and
   the raised structure comprises a plurality of cube corner elements on a surface thereof.

2. A retroreflective sheeting in accordance with claim 1, further comprising: stress dissipating means disposed adjacent the first raised structure.

3. A retroreflective sheeting in accordance with claim 1, wherein:
   the tallest cube corner element on the structured surface extends a height D" above a reference plane;
   the raised structure extends a height D' above the reference plane; and the ratio D': D" measure between 1.1:1.0 and 2.0: 1.0.

4. A retroreflective sheeting in accordance with claim 1 further comprising: a sealing medium disposed adjacent the structured surface.

5. A retroreflective sheeting in accordance with claim 1, wherein the raised structure comprises:
   a first side wall extending from a groove in the substrate at an angle measuring between 60 degrees and 90 degrees, relative to the base plane;
   a top surface extending from the first side wall and approximately parallel to the base plane; and
   a second side wall extending from the top surface to a groove in the substrate at an angle measuring between 60 degrees and 90 degrees, relative to the base plane.

6. A retroreflective sheeting in accordance with claim 5, wherein:
   the top surface includes an ultrasonic energy concentrator.

* * * * *